US007212208B2

(12) United States Patent
Khozai

(10) Patent No.: US 7,212,208 B2
(45) Date of Patent: May 1, 2007

(54) SYSTEM AND METHOD TO PRESENT AND DISPLAY MULTIPLE DATA USING ENHANCED BOX CHARTS

(76) Inventor: Bahram Khozai, 687 W. Glebe Rd., Alexandria, VA (US) 22305-1445

( * ) Notice: Subject to any disclaimer, the term of this patent is extended or adjusted under 35 U.S.C. 154(b) by 50 days.

(21) Appl. No.: 10/372,199

(22) Filed: Feb. 25, 2003

(65) Prior Publication Data

US 2004/0164983 A1    Aug. 26, 2004

(51) Int. Cl.
*G06T 11/20*    (2006.01)
(52) U.S. Cl. ................................... 345/440
(58) Field of Classification Search ................. 345/440
See application file for complete search history.

(56) References Cited

U.S. PATENT DOCUMENTS

| | | | | |
|---|---|---|---|---|
| 5,461,708 | A | 10/1995 | Kahn | 395/140 |
| 5,524,187 | A | 6/1996 | Feiner et al. | 395/119 |
| 5,555,354 | A | 9/1996 | Strasnick et al. | 395/127 |
| 5,627,959 | A | 5/1997 | Brown et al. | 395/356 |
| 5,734,382 | A | 3/1998 | Kuno | 345/440 |
| 5,933,830 | A | 8/1999 | Williams | 707/100 |
| 6,211,873 | B1 * | 4/2001 | Moyer | 345/764 |
| 6,222,540 | B1 * | 4/2001 | Sacerdoti | 345/440 |
| 6,356,256 | B1 | 3/2002 | Leftwich | 345/157 |
| 6,366,289 | B1 | 4/2002 | Johns | 345/543 |
| 6,400,366 | B1 | 6/2002 | Davies et al. | 345/440 |
| 6,414,691 | B1 | 7/2002 | Nakagawa et al. | 345/619 |
| 6,473,080 | B1 | 10/2002 | Brown et al. | 345/419 |
| 2001/0019328 | A1 * | 9/2001 | Schwuttke et al. | 345/440 |
| 2002/0040336 | A1 | 4/2002 | Blanchard et al. | 705/36 |
| 2002/0103777 | A1 | 8/2002 | Zhang | 706/59 |
| 2003/0006987 | A1 * | 1/2003 | Ericsson et al. | 345/440 |
| 2003/0139989 | A1 * | 7/2003 | Churquina | 705/35 |

FOREIGN PATENT DOCUMENTS

EP    1 109 122 A2 *    4/2001

OTHER PUBLICATIONS

Visual Mining, Inc., assorted screen shots, http://www.visualmining.com/examples/, printed Nov. 26, 2002, copyright 1996-2002, 14 pages.
RockWare Inc., assorted, screen shots, http://www.rockware.com/catalog/pages/imagepage.html, printed Nov. 26, 2002, 3 pages.
OriginLab Corporation, "Column, Polar, and BOX Example", http://www.originlab.com/www/resources/graph_gallery/subjectindextemplate.asp?TypeID=Column,+Polar,+and+Box, printed Nov. 27, 2002, copyright 1991-2002, 1 page.
CORDA Technologies, Interactive Data Visualization, http://www.corda.com/, printed Nov. 16, 2002, copyright 1996-2002, 4 pages.
http://mathstat.carleton.ca/~help/sashtml/gc/chap32/sect23.htm#boxex4, copyright 1999, 7 pages.
Steve Nison, *Japanese Candlestick CHarting Techniques*, Second Edition, 2001, New York Institute of Finance, Paramus, New Jersey, p. 25.
John Bollinger, *Bollinger on Bollinger Bands*, 2002, McGraw-Hill, New York, p. 55, Figure 7.1.

* cited by examiner

*Primary Examiner*—Jeffery A. Brier
(74) *Attorney, Agent, or Firm*—Pillsbury Winthrop Shaw Pittman, LLP

(57) ABSTRACT

A system and method for presenting and displaying multiple data in graphical form. A universal, objective, and quantifiable measuring presentation tool provides a quick graphic display of multiple data (e.g., parameters, functions, or metrics) under study. This data could be achievement, performance, accomplishment, or any other information that needs to be quantifiably and objectively measured and displayed using a number of user-defined criteria. The display provides for easy, quantifiable and objective visually graphic comparison among various entities whose parameters are being viewed.

170 Claims, 23 Drawing Sheets

SYSTEM AND METHOD TO PRESENT AND DISPLAY MULTIPLE DATA USING ENHANCED BOX CHARTS

FIELD OF THE INVENTION

The invention relates generally to the presentation and display of multi-dimensional data, including the use of enhanced box charts.

BACKGROUND OF THE INVENTION

Graphs of statistical and other data have existed for a long time. One technique for displaying data includes the use of box charts. A box chart, sometimes referred to as a "Box And Whiskers" chart, can be used to display statistical data within a data set. Multiple box charts may also show different data sets, and have multiple grids and axes. In one case, a box chart may be used to display a minimum data point, a maximum data point, a 25th Percentile, a 50th Percentile, a 75th Percentile, and if desired, any outliers.

FIG. 1 illustrates an example of a box chart that displays data regarding a range of data samples. This box chart includes a box or body portion (sometimes referred to as "real body") having a longitudinal axis and lines or narrow rectangles that extend therefrom in the direction of the longitudinal axis. The lines or narrow rectangles (sometimes referred to as "whiskers" or "shadows") represent the extremes of the range of data. The ends of the box (body portion) represent two intermediate values such as the 25 and 75 percentile values. In some cases, a line is also drawn through the rectangular body perpendicular to the longitudinal axis to show the mean value. As shown, a basic box chart typically uses the length of the body, the length of the whiskers and one or more axes to display data. In some cases, for example where multiple box charts are used to represent multiple data sets, the entirety of one or more box charts may be colored to distinguish one data set from another.

One well-known box chart is the Japanese "candlestick," which is used in the technical analysis of financial markets. In this application, the low, high, opening and closing prices of a certain commodity during a certain period of time are presented as a box chart. While box charts in general are known and have been used, existing known uses provided a limited amount of data in a rigid way. These and other drawbacks exist.

SUMMARY OF THE INVENTION

The invention provides a system and method for presenting and displaying multiple data in graphical form, including the use of enhanced box charts. The enhanced box charts provide a universal, objective, and quantifiable tool to provide a quick graphic display of multiple data (e.g., parameters, functions, metrics, variables, attributes or other data).

An enhanced box chart is a display system that may include at least one body portion, one or more extensions extending from one or more sides (or boundaries) of the body portion, and multiple axes, scales or other designators. Various attributes of the body portion and extensions may be used along with sub-elements of the enhanced box chart to convey and display more data and information than a traditional box chart.

The body portion may be in the form of a rectangle or other suitable shape, including without limitation a square, a circular shape, elliptical shape, any polygonal shape, or any other suitable shape or structure. Irregular shapes, non-geometric shapes, pictures, symbols, signs, images, graphics and other body portion may also be used. The shapes of the body portion can be amorphous and/or dynamic, that is, the shape may dynamically change according to changes in the underlying data, upon the occurrence of certain events or conditions or based on other factors. The dynamic nature of the body portion may be used to display a time series of data or otherwise. Dynamic attributes can also extend to all other aspects of the enhanced box chart. For example, the scales or coordinate axes may dynamically change along with changes in the underlying data. The attributes (e.g., dimensions, colors and other attributes) of the body portion may represent certain data. For example, in the case of a rectangle, the length or any parts of the rectangle may correspond to data, a range of data values or other values. Additionally, the width or any parts of the rectangle may correspond to data, a range of data, or other values. If desired, the body portion may comprise a third or more dimension that may also represent certain data. For example, in the case of a rectangular shaped body portion, a depth may correspond to other values. In other cases a portion of the length, width, depth or other dimension may be used to represent one or more data values.

One or more extensions may extend from one or more sides, ends, surfaces, or other boundary portion of the body portion. For example, in the case of a rectangular body portion, one or more extensions may extend from one or more of each side or end of the rectangle. For simplicity, as used herein the terms side and end may be used interchangeably. To avoid repetition, the use of either side or end will be understood to include the other, unless expressly stated otherwise. Each extension may be a line, a curve, a rectangle or any other shape or structure. The attributes (e.g., dimensions, color or other attributes), or any parts thereof, on, within or adjacent to the extension may represent certain data. For example, in the case of a line, the length of the line may correspond to a range of values. In the case of a rectangle, the length of the rectangle may correspond to a range of values and the width of the rectangle may correspond to other values. If desired, the extension(s) may comprise a third or more dimension that may also represent certain data. For example, in the case of a rectangular shaped extension, the depth or parts thereof may correspond to other values.

Various axes or other designators may be included on, within, adjacent to or outside of the body portion to represent one or more scales or other frames of reference. Various axes or other designators may be included on, within, adjacent to or outside of all or some extensions. The axes may be manually located, automatically located or otherwise generated or called up. According to one embodiment the axes are self-scaling. (The scales, self-scales or coordinate axes or self-gradation can be in the forms of numbers, graduated colors, signs, symbols, images, graphics, sound or shapes.)

The term attribute as used herein is intended to be construed broadly except when used in a specific way. The attributes of the body portion may include the dimensions of the body portion (e.g., its width, length and/or depth), the angular orientation of the body portion, various axes on, within, adjacent to or outside the body portion, and various combination of shapes, symbols, pictures, signs, images, graphics, colors, sounds, videos associated with the body portion or portions thereof. The attributes of the extensions may include the dimensions of the extensions, (e.g., its length, width and/or depth), the angular orientation of the extension, various axes on, within, adjacent to or outside the extension, and various combination of shapes, symbols, signs, images, graphics, sounds, videos and colors associated with the extension or portions thereof.

One or more body portions, extensions, attributes, scales, or sub-elements can be static or dynamic, based on certain user-desired changes in the underlying data and/or the occurrences of certain events whether related or not related to changes in the underlying data. Any such changes may result in corresponding changes in a set of user-defined attributes. The relation between the changes (e.g., in some underlying data and/or the occurrences of certain events not directly related to the underlying data) and their corresponding manifestations in any combinations of the attributes may be linear or non-linear, time-varying or caused by certain cascading and/or conditional occurrences of some user-defined or user-desired events. Thus, the shape of the body portion, the self-scale of some metrics, the colors of some extensions and other elements may change if certain changes in certain data or certain events take place. These changes may be transient (e.g., a temporary change that reverts back to its state before the change) and/or permanent (e.g., remains as changed until another change takes place, but without reverting back) and may lead to similar dynamic changes in certain other elements and/or activate certain other displays.

The sub-elements may include various axes, lines, shapes, symbols, signs, colors, images, graphics, sounds, videos, links, and other enhanced or other box charts on, within, adjacent to or outside the body portion. Additional sub-elements may include various axes, lines, shapes, symbols, pictures, signs, images, graphics, sounds, videos, and colors and other enhanced box charts on, within, adjacent to or outside one or more extensions. Each sub-element may itself include additional user-defined sub-elements.

The use of various combinations of multiple extensions from one or more sides of a body portion, sub-elements and various attributes of the body portion, extensions and sub-elements can provide a powerful tool to succinctly display in a single enhanced box chart, many selected data values, from many selected data sets, many levels of data (fractalization), and other data related information. Various other advantages exist.

As used herein, the term data is intended to be construed broadly. For example, the data may be a collection of numbers that may or may not have units associated therewith. The data may correspond to quantitative or qualitative data, raw data, manipulated or processed data, summary data, statistical data, metadata, or any other data-related values (or any combination thereof) or other values or information. The data, values or other information may relate to quantitative, comparative and/or analytic study of one or more subjects. By way of example, the data could be achievement, performance, accomplishment, or any other information that needs to be quantifiably and objectively measured and displayed using a number of user-defined criteria. The enhanced box charts of the invention may also be used to display non-data items as well. The foregoing examples of data, values and information types are not intended in any way to limit the generality of the type of the data, values or information that can be displayed with the enhanced box charts of the invention. For convenience, unless otherwise indicated, as used hereafter the term data will be used to include data, values and other information.

Whenever one of the terms data or values or information is used herein, it is understood that any of the other terms could be used in its place, unless otherwise indicated or apparent from the example.

One aspect of the invention relates to a tool that enables a user to select one or more data sets (from any suitable data source) for display and to specify various aspects of the enhanced box chart(s) for display. For example, a user may select one or more of: one or more data sources (or portions thereof), the number and shapes of the body portion(s), the number and shapes of the extension(s), the sub-element(s) to be displayed, the attributes of the body portion(s) and extension(s), axes or other designators (and characteristics thereof), or frames of reference. A user may select other attributes and features as detailed below. The user can also specify what data, values or other information each of the components of the enhanced box chart represent, and for any display what components to display.

In any of a plurality of capacities as defined by a user, portions of the enhanced box chart can be flexibly defined to convey particular data, attributes of the underlying data or other user-desired information. For example, an attribute of the underlying data can be represented by the thickness, relative length, or color of one or more lines in the chart. These lines may or may not represent the lines that give primary definition to the shape of the body portion or extensions.

One or more data sources or portions thereof may be selected for comparative display using one or more enhanced box charts that are simultaneously or sequentially displayed. These and other aspects of the invention provide for easy, quantifiable and objective visually graphic comparison among various data whose parameters are being viewed. Various templates may be provided, created, or modified to facilitate a user's selection of the various display choices. Users may also create, modify and store their own templates for ease of reuse.

Another aspect of the invention relates to the resulting enhanced box charts. Each enhanced box chart may be displayed in any of a variety of formats or in different media, including for example, as a computer printout; as a display on a computer monitor, television, high definition TV, digital TV, or other screen; as a projection, digital projection, virtual reality, augmented vision or hologram; in all cases as a one, two, or three-dimensional display; or as a telepresence re-creation.

It is also a feature of the invention that an enhanced box chart can include interactive elements that enable a user to access further charts, data or other information. These further charts, data or other information may convey, for example, a summary or a subset of the information being displayed on the first chart, a view of a new combination of data or other levels of detail. This navigation feature enables a user to quickly and intuitively gain an understanding or "feel" of the meaning of the underlying data by drilling down, drilling up or drilling sideways through the data.

In interactive media, clicking on, hovering over or otherwise selecting any aspect of the enhanced box chart (e.g., a body portion, extension, sub-element, attribute, data point, segment, side, shape, symbol, sign, color, images, graphics, sounds, videos, number or statistical or functional representation singly or in any combination or any other element of the enhanced box chart can cause the display of:

a) a new enhanced box chart that has been linked to that particular subset;

b) data, values and/or information relating to the selected display element;

c) any combination of (a) and (b); and d) any other desired display element

Enhanced box charts can be used to represent multiple data in multiple frames of reference by containing, adopting, assuming and/or utilizing various body portions (with regular or irregular shapes), extensions, sub-elements and attributes thereof (e.g., symbols, signs images, graphics, sounds, videos, or colors) in one unified, integrated graph. The one or more extensions may be in the form of lines, rectangles or other shapes of any kind or form, symbols or signs, and may each contain additional data and/or other information. The extensions may extend from any one or more of the sides, ends or boundaries of the body portion. These extensions can display data about the maximum and minimum data points (ranges) and partial maxima and minima data points of various aspects of the data set or may represent other data or information. The attributes of the body portions, extensions or sub-elements represent many data points or pieces of information. Such attributes may include various partial and/or segmented thicknesses and/or colors. Additionally, the attributes of any line or portion thereof on the sides, inside or in the immediate vicinity of the enhanced box chart can include various shapes, symbols, signs, colors, images, graphics, sounds, or videos, to convey additional data or pieces of information.

Further, all the sides and inside shapes and the extensions may have self-scaled or graded single or multiple coordinate axes (or frames of reference) on themselves or in their immediate vicinity to eliminate the need for outside, ordinary coordinate axes for data or quantitative measurement. Such coordinate axes may take on the form of grades or graduated markings, gradually changing colors, symbols or signs on the sides, inside or in the immediate vicinity of the enhanced box chart, any and all with or without accompanying numbers and/or units.

Multiple non-data, but informational, shapes, signs, symbols, pictures, images, graphics, sounds, videos, or logos maybe placed anywhere on, inside or in the immediate vicinity of the enhanced box chart to convey additional information about the subject matter. Various shapes containing data or information that are on the sides, inside or in the immediate vicinity of the enhanced box chart may themselves take the form of enhanced box charts including self-contained scales or graded axes.

Every part or sub-part of the shapes, signs, symbols, partial lengths, thicknesses, colors or "landmarks" of the body portion, extensions or sub-elements on, inside or in the immediate vicinity of the enhanced box chart can convey some data or information about the subject matter.

One aspect of the invention is that a user can decide how many simultaneous pieces of data and/or information she wants to display in, by and through the enhanced box chart and the number of box charts to simultaneously display.

All data displayed in any one of the many frames of reference on the sides, inside or immediate vicinity of the enhanced box chart may be proportionately sized, segmented, thickened, colored or otherwise their measurements may be displayed relative to that one particular frame of reference. Therefore, as may be desired by a user, some data may be displayed more than once, in more than one frame of reference, on the sides, inside or in the immediate vicinity of the enhanced box chart. In each case, those displayed data are measured relative to each particular frame of reference. Further, in addition to various frames of reference in which a quantity may be displayed in the enhanced box chart, the quantity's attributes (e.g., symbol and/or sign and/or shape or other attributes) may vary as well within a single unified enhanced box chart.

Further, in addition to displaying a quantity, certain signs, symbols, images, graphics, sounds, videos, or shapes on the sides, inside or in the immediate vicinity of the enhanced box chart may indicate the absolute or relative changes, the directions and the magnitudes of those changes of the quantity displayed in, through or by the enhanced box chart. These values may be displayed relative to the same frame of reference used for the quantity or they may be displayed in different frames of reference.

Significant data points or landmarks of a curve can be displayed in a unified presentation as, through or by the enhanced box chart. Further, significantly, the area under a curve between two user specified numbers can be represented as the area of the body portion or a subset of the body portion in addition to its being able to be displayed by other shapes, symbols, signs images, graphics, sounds, videos, or colors. Specifically, sample data concentration around the mean of the normal distribution curve (e.g., a bell curve) can be directly related to and/or represented by the shape of the body portion of the enhanced box chart. Further, specifically, sample data concentration around the poles of multi-polar curves can be represented proportionally by the shapes of various subsets of the body portion. For example, in the case of a rectangular body portion, the width of the rectangle may correspond to the distance between two points on the bell (or other) curve. The length of the rectangle may correspond to the height (or a value related to the height) of the curve.

To display the actual magnitude of any outliers in the enhanced box chart (in addition to using other shapes, symbols, signs, or colors) an end of the extensions can be displayed as a collapsed element e.g., a spiral, curly, zig-zagged, folded, twisted, or accordion-like collapsed line (or other shape). The length of this collapsed line, in the form of these representations, is equal to the length of the outlier. In this way, the display provides an immediate physical understanding of the size/magnitude of the outlier data sample yet enables the outlier to be displayed in close proximity to the body portion or extension without unduly distorting any scales or axes. In an interactive embodiment, the display can enable a user to "lift" (e.g., straighten or "un-collapse") this collapsed line to see its actual length (optionally with a dynamic, temporary re-scaling of any relevant axes) to better see that actual value of the outlier and then cause it to collapse back when desired by the user. Normally, outliers disproportionately occupy space in graphs, unduly distort axes or out of necessity are shown in discontinuous portions of the scale. But this makes it more difficult to understand the relative value of the outlier compared to other data.

Further, the enhanced box chart, singly or in combination or in procession with other enhanced box charts, can be displayed on regular, outside frames of reference while containing and carrying its own various frames of reference. Further, the enhanced box chart can be rotated to any degree without losing any of its display capabilities. Further, an enhanced box chart can be rotated along the axis of any of its extensions (or other axes) without losing any of its display capabilities.

Each new enhanced box chart or other portion of an enhanced box chart itself may be related to other enhanced box charts or other displays to permit various levels of data to be analyzed.

These and other objects, features, and advantages of the invention will be apparent through the detailed description of the preferred embodiments and the drawings attached hereto. It is also to be understood that both the foregoing general description and the following detailed description are exemplary and not restrictive of the scope of the invention.

DETAILED DESCRIPTION OF PREFERRED EMBODIMENTS

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

One aspect of the invention relates to the use of enhanced box charts for the display of data. In general, an enhanced box chart is a display system that may include at least one body portion, one or more extensions extending from one or more sides, surfaces or boundaries of the body portion, and multiple axes, scales or other designators. Various attributes of the body portion and extensions may be used along with sub-elements (e.g., various axes, lines, shapes, symbols, signs, images, graphics, sound, video and colors, links, and other enhanced or other box charts) of the enhanced box chart to convey and display more data and information (in a unified, integrated way) than a traditional box chart. Particular sub-elements may themselves take the form of an enhanced box chart. More than one enhanced boxed chart may be simultaneously displayed.

According to one aspect of the invention, a user interface is provided to enable a user to select the various features of the box chart (detailed below), including, for each enhanced box chart, the characteristics of the body portion and its attributes, the characteristics and number of the extensions and their attributes, the sub-elements, and the axes or scales. Other aspects of the enhanced box charts may also be user selected. If desired, instead of all the features being selected or selectable by a user, some aspects may have default settings. A user selectability coupled with the enhanced features of a box chart enabled by the invention provide a powerful advantage over prior systems.

Figure 1:
FIG. 1 illustrates a conventional graphical display of data.
Figure 2A:
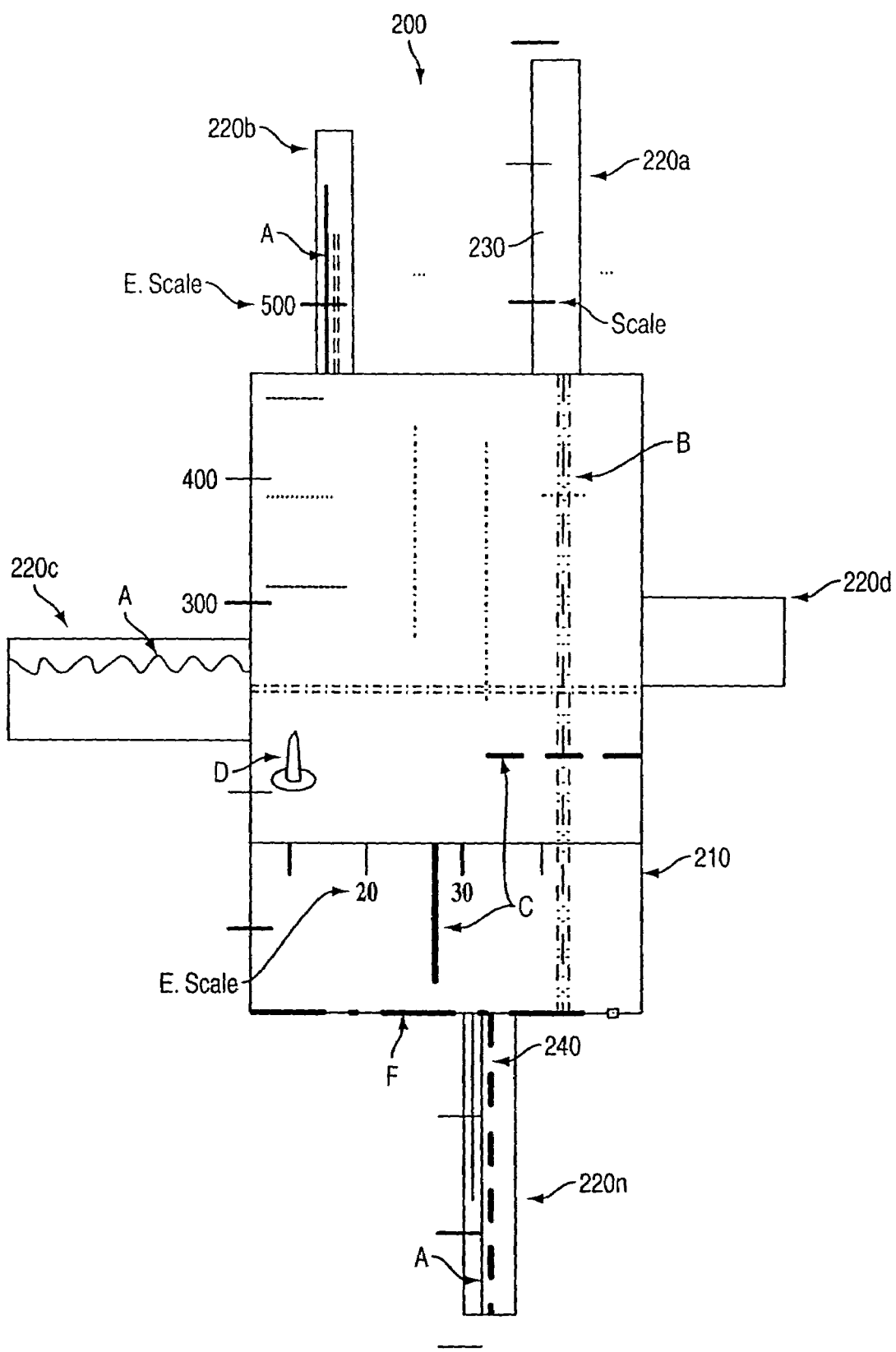
FIG. 2A illustrates an embodiment of an enhanced box chart.

A generic embodiment of an enhanced box chart is illustrated in FIG. 2A. This generic embodiment is provided primarily to illustrate various features of the enhanced box chart. The example provided is solely to illustrate one embodiment of the invention. The invention is not so limited. As illustrated in FIG. 2A, enhanced box chart 200 includes at least one body portion 210, one or more extensions (generally denoted as a first extension 220a, a second extension 220b, third extension 220c, fourth extension 220d ... 220n), one or more axes, scales or other designators and various sub-elements. As illustrated in FIG. 2A, body portion 210 can have a rectangular shape. More generally, however, body portion 210 may have any other suitable shape, including without limitation a square, a circular shape, an elliptical shape, any polygonal shape, or any other suitable shape or structure. Irregular shapes, non-geometric shapes, pictures, symbols, signs, images, graphics and other body portion may also be used. In one embodiment, the shapes can be amorphous and dynamic, that is, the shape may dynamically change according to changes in the underlying data, the occurrence of some user-desired events or to display a time series of data or otherwise. The attributes (e.g., dimensions and other attributes) of the body portion may represent certain data. For example, in the case of a rectangle, the length or any parts of the rectangle may correspond to data, a range of data values or other values. Additionally, the width or any parts of the rectangle may correspond to data, a range of data, or other values. If desired, the body portion may comprise a third or more dimension that may also represent certain data. For example, in the case of a rectangular shaped body portion, a depth may correspond to other values. In other cases a portion of the length, width, depth or other dimension may be used to represent one or more data values.

As further shown in FIG. 2A, various shapes, thicknesses, symbols and signs (A) may represent data points of relative maxima and minima of subject matter. Various shapes, symbols, and signs (B) may represent data points inside the body portion 210. Various color schemes (C) may represent various aspects of data samples. Various logos, signs, pictures, images, graphics or symbols (D) may represent non-data pieces of information.

Many internal and external self-scaled gradation and units (E) may be used.

Figure 2B:
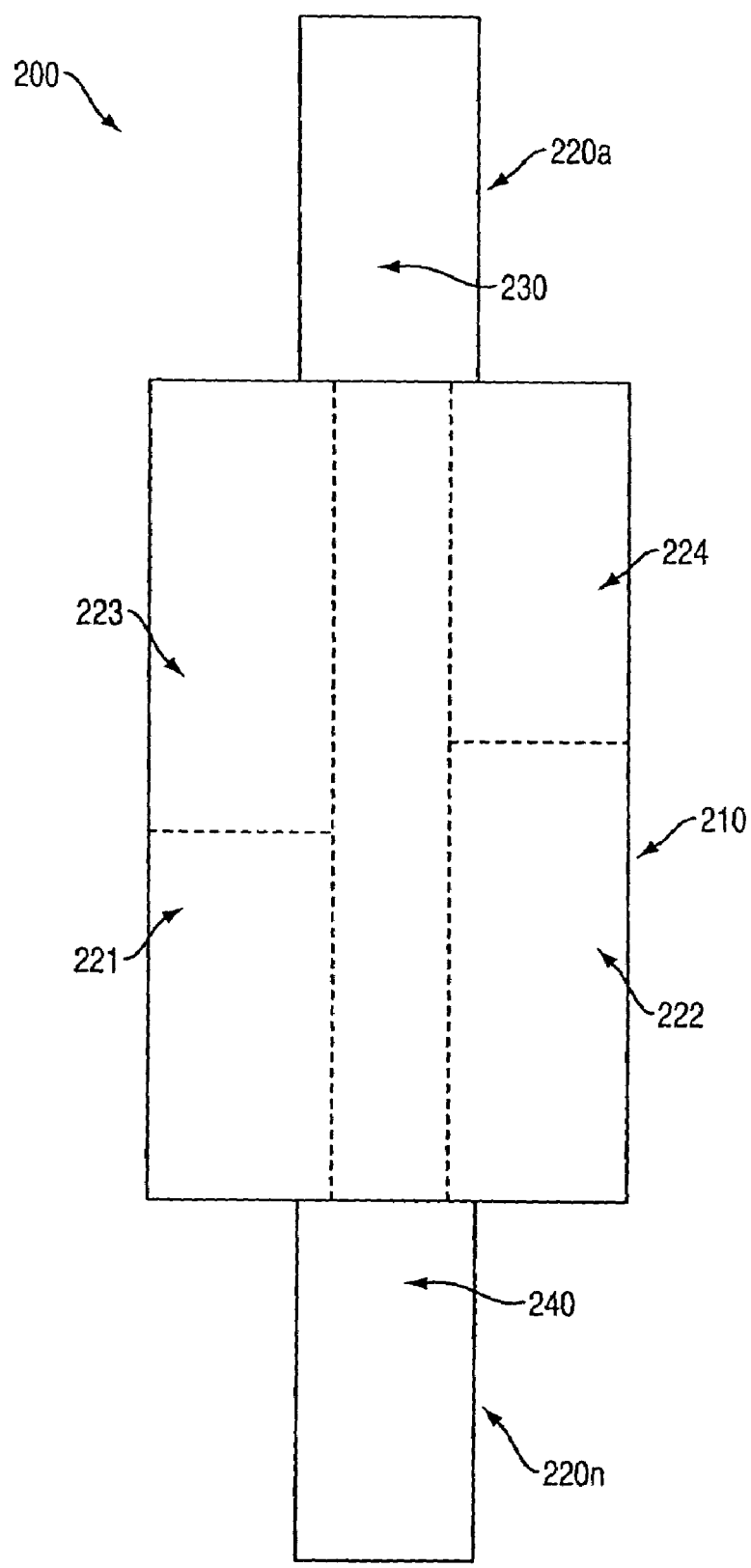
FIG. 2B illustrates an embodiment of an enhanced box chart.

Various portions of the sides (F) of the body portions and the extensions 220 may represent data points and/or non-data pieces of information. The immediate vicinity of the enhanced box chart can provide additional data points and/or pieces of information. As shown in FIG. 2B, areas 221–224 of body portion 210 can also be used to enhance the graphical display of data. In one embodiment, the thickness and length of lines in areas 221–224 along the vertical sides of body portion 210 can also correspond to some user-defined attributes of the samples. For example, the thickness and length of lines in area 221, positioned along the lower left side of body portion 210, can correspond to samples up to a first value (e.g., mean value); the thickness and length of lines in area 223, positioned along the upper left side of body portion 210, can correspond to samples above the first value; the thickness and length of lines in area 222, positioned along the lower right side of body portion 210, can correspond to samples up to a second value (e.g., median value); and the thickness and length of lines in area 224, positioned along the upper right side of body portion 210, can correspond to samples above the second value. All of these lines in areas 221–224, partial or otherwise, can be color-coded to correspond to particular characteristics of the underlying data.

Referring back to FIG. 2A, The width of body portion 210 can also be user-defined to convey additional information to a user in its display. For example, the width of the body portion can be chosen by a user to correspond to the length between the percentile cut-off points of the distribution (e.g., bell curve) being observed. Thus, a relatively narrow enhanced box chart could correspond to a distribution whose samples are closer to or more concentrated around the mean, while a relatively wide enhanced box chart could correspond to a flatter distribution having a wider dispersion of samples. More generally, the area of body portion 210 can be user-defined to convey additional information. For example, the area of body portion 210 (regardless of shape) could be chosen to correspond to a value such as the area under the distribution curve between two user-defined cut-off points. Still further, the shape of body portion 210 can also be designed to convey additional information relating to the shape of the distribution itself.

The thickness of the line defining the width of body portion 210 can also be a user-defined measure. For example, the thickness of the top edge of body portion 210 could correspond to the number of samples within a certain distance from the mean value, while the thickness of the bottom edge of body portion 210 could correspond to the number of samples within a certain distance from the median value. More generally, the thickness of the top or bottom edge of body portion 210 can be used to provide some information regarding the dispersion of values in the distribution. These lines can also have multiple color-codings to convey particular characteristics of the underlying data.

Extensions. In general, one or more extensions (220a . . . 220n) may extend from one or more sides, surfaces, or other boundaries of the body portion 210. For example, in the case of rectangular body 210, one or more extensions may extend from one or more sides of the rectangle. Each extension may be a line, a curve, a rectangle or any other shape or structure. The attributes such as dimensions (e.g., length, width and/or depth), the angular orientation of the extension, various axes on, within, adjacent to or outside the extension portion, various combination of shapes, symbols, signs, pictures, images, graphics and colors associated with the extension or any parts thereof of the extension may represent certain data. For example, in the case of a line, the length of the line may correspond to a range of values. The width of the line may represent other data. The color of all or a portion of the line may represent other data or information. In the case of a rectangle, the length of the rectangle may correspond to a range of values and the width of the rectangle may correspond to other values.

In one example, the thickness of a line representing an extension (e.g., 220a and/or 220b) can be selected to correspond to a number of samples outside of the "cut-off" range of body portion 210. This cut-off range can be a user-defined (or other) percentile range of a distribution (e.g., 10% and 90%). In addition to the relative thickness of the lines representing extensions (220a . . . 220n), multiple lines of various lengths can also be used. These multiple lines of various lengths can correspond to various data values outside of body portion 210. Still further, extension lines within an upper extension area 230 and lower extension area 240 can be color-coded to correspond to particular characteristics of the underlying data.

Various axes, scales, or other designators may be included on, within, adjacent to or outside of the body portion to represent one or more scales or other frames of reference. Various axes or other designators may be included on, within or outside of all or some extensions. The axes may be manually located, automatically located or otherwise generated or called up. According to one embodiment the axes are self-scaling. (The scales, self-scales or coordinate axes or self-gradation can be in the forms of numbers, graduated colors, signs, symbols, images, graphics or shapes.)

Dynamic Attributes. One or more body portions, extensions, attributes, scales, or sub-elements can be static or dynamic, based on certain user-desired changes in the underlying data and/or the occurrences of certain events not directly related to the underlying data. Any such changes may result in corresponding changes in a set of user-defined attributes. The relation between the changes in some underlying data and/or the occurrences of certain events not directly related to the underlying data and their corresponding manifestations in any combinations of the attributes may be linear or non-linear, time-varying or caused by certain cascading and/or conditional occurrences of some user-defined or user-desired events. Thus, the shape of the body portion, the self-scale of some metrics, the colors of some extensions and other elements may change if certain changes in certain data or certain events take place. These changes may be transient and/or permanent and may lead to similar dynamic changes in certain other elements and/or activate certain other displays.

Dynamic attributes can also extend to scales or coordinate axis, which may dynamically change along with its underlying data. Attributes such as dimensions (e.g., width, length and/or depth), the angular orientation of the body portion, various axes on, within, adjacent to or outside the body portion, various combination of shapes, symbols, picture, signs, images, graphics, colors, sounds, videos associated with the body portion may represent certain data. For example, in the case of a rectangle, the length or any parts of the rectangle may correspond to a range of data values or other values. Additionally, the width or any parts of the rectangle may correspond to other values. If desired, the body portion may comprise a third or more dimension that may also represent certain data. For example, in the case of a rectangular shaped body portion, a depth may correspond to other values. In other cases a portion of the length, width, depth or other dimension may be used to represent one or more values.

Sub-Elements. The sub-elements may include various axes, lines, shapes, symbols, signs and, colors, images, graphics, sounds, videos, links, and other enhanced or other box charts on, within, adjacent to or outside the body portion. Additional sub-elements may include various axes, lines, shapes, symbols, pictures, signs, images, graphics, sounds, videos, and colors and other enhanced box charts on, within, adjacent to or outside one or more extensions. Each sub-element may itself include additional user-defined sub-elements. Various sub-elements can also be used inside or adjacent to enhanced box chart 200. For example, inside, or adjacent to, body portion 210 there can be multiple color-codings to distinguish various user-defined attributes of the samples. The potential use of the multiple color-codings is described in greater detail below. Inside, or adjacent to, body portion 210 there can be various lines and markings to signify various user-defined information such as the mean, median, certain sample value(s), etc. Inside, or adjacent to, body portion 210 can also be the logo, coat-of-arms or other distinguishing characteristics that distinguish the enhanced box charts. This may prove especially useful in comparative or fractal enhanced box charts. Fractal enhanced box charts are described in greater detail below.

Axes. Further, all the sides and inside shapes and the extensions may have self-scaled or graded single or multiple coordinate axes (or frames of reference) on themselves or in their immediate vicinity to eliminate the need for outside, ordinary coordinate axes for data or quantitative measurement. Such coordinate axes may take on the form of grades or graduated markings, gradually changing colors, symbols or signs on the sides, inside or in the immediate vicinity of the enhanced box chart, any and all with or without accompanying numbers and/or units. Through the upper and lower extension areas (230, 240) and the sides of body portion 210 there can be graded or scaled (or other frame of reference) markings such that enhanced box charts can have self-contained graded axes. These axes may be manually located, automatically located, or otherwise generated or called up. As would be appreciated, an enhanced box chart can, singly or in combination or in procession with other enhanced box charts, be displayed on regular, outside frames of reference while containing and carrying its own various frames of reference.

Alternatively, at the sides or adjacent to them, graduated colors, signs, symbols, or other shapes can be used to accomplish similar functions. Further, in addition to displaying a quantity, certain signs, symbols or shapes on the sides, inside or in the immediate vicinity of the enhanced box chart may indicate the absolute or relative changes, the directions and the magnitudes of those changes of the quantity displayed in, through or by the enhanced box chart. These values may be displayed relative to the same frame of reference used for the quantity or they may be displayed in different frames of reference.

Angular Orientation. Enhanced box charts can also be displayed vertically, horizontally or obliquely. In general, the enhanced box chart can be rotated to any degree without losing any of its display capabilities. The angular orientation of the display itself, relative to some axis, may convey information about the data.

3-D. Enhanced box charts can be presented in 3-D with the side and top enhanced box chart(s) acting independently, or as a subset, or as a combination, of the front enhanced box chart. In special cases, or for special purposes enhanced box charts may take other geometric forms such as those described elsewhere herein.

In interactive media, each attribute can be enlarged and/or highlighted by activating the interactive device, such as clicking a computer mouse, which can move down or around to any single data sample or group of data samples or to the (user-defined) limit set by the "administrator" of the system.

Outliers. To display the actual magnitude of outliers in the enhanced box chart (in addition to using other shapes, symbols, signs, or colors) specifically an end of the extensions can be displayed as collapsed lines (e.g., spiral, curly, zigzagged, folded, twisted, accordion-like or other collapsed lines). The length of this collapsed line, in the form of these representations, is equal to the length of the outlier. In this way, the display shows the enhanced box chart and the outlier(s) without a discontinuous scale. This provides a visually immediate physical understanding of the size/magnitude of the outlier data sample. In an interactive embodiment, the display can enable a user to expand this collapsed line to see it even better and then let it collapse back after observation is finished. Normally, outliers disproportionately occupy space in graphs or out of necessity are shown in discontinuous portions of the scale. But this makes it more difficult to visually understand the relative value of the outlier compared to other data. One advantage of a self-scaled data points or self-axis data points is that the axis and the data points/outliers can accommodate each other both dynamically and statically, as in the case of outlier representation.

So both outlier samples and its axis can be collapsed and expanded together. In the case that expanding an outlier sample would cause it to go beyond a viewable page, the system can wrap it around one or more pegs as needed to preserve the visual physical understanding of the magnitude of the outlier sample data (and its continuous nature). Then let it curl or otherwise collapse back to its original state.

As thus described, enhanced box charts can be customized to convey various forms of information in various ways. Particular implementations of enhanced box charts can be designed to leverage some or all of the features described above.

Before describing how various implementations of enhanced box charts may be customized for different applications, an example of a computer system and user interface are provided, each of which may be used in connection with the invention.

Figure 2C:
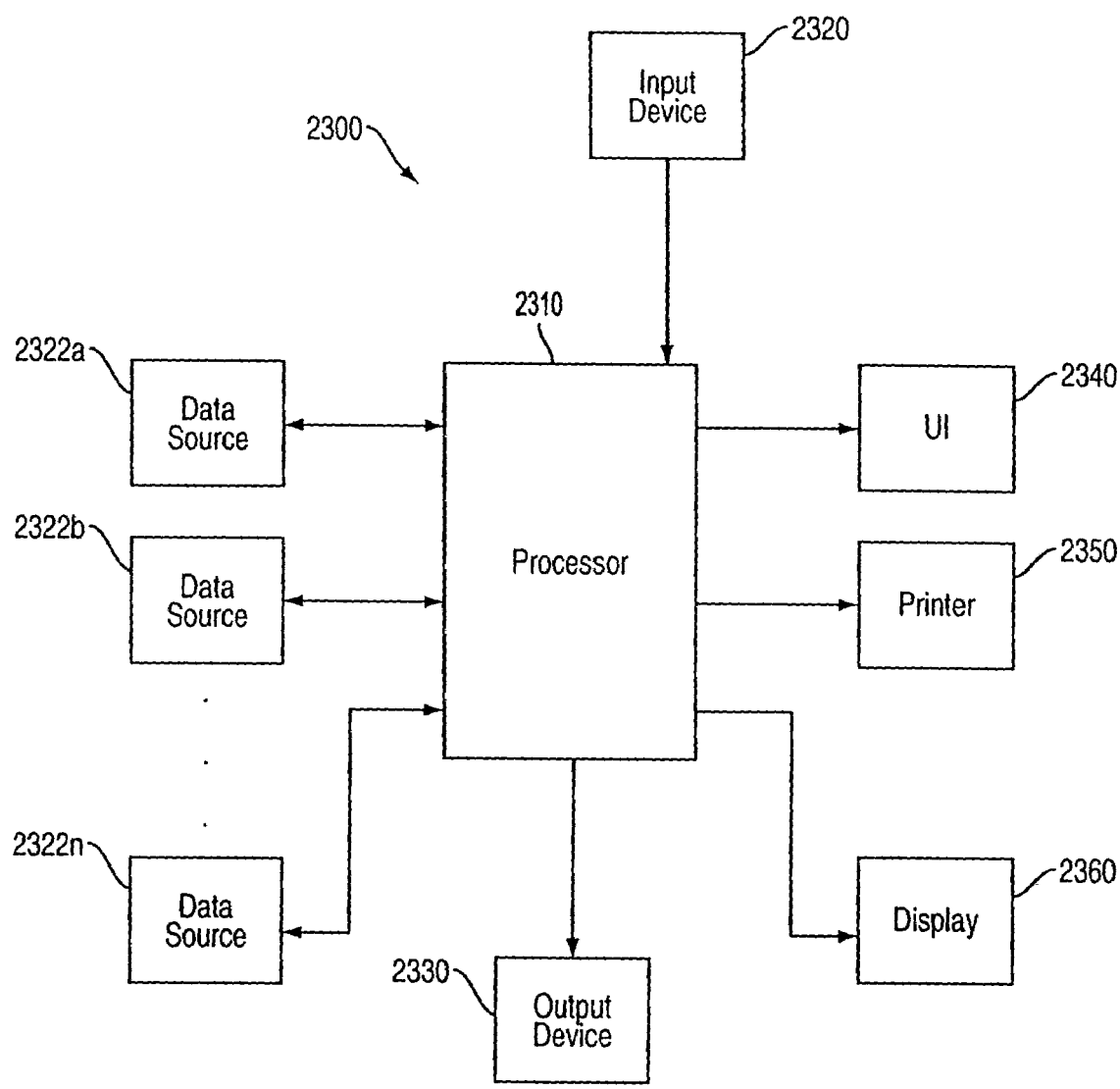
FIG. 2C illustrates a block diagram of a computer system, according to an embodiment of the invention.

Computer System. FIG. 2C illustrates a block diagram of a computer system that may be used in connection with the invention. This computer system 2300 could be used in various capacities such as, for example, defining, generating, viewing, and modifying enhanced box charts and the access to those enhanced box charts. In various embodiments, computer system 2300 can be implemented using any suitable commercially available computer system. The software aspect of the invention may be stand alone software, an add-on to another program (e.g., Excel) or imbedded in such a software program.

The computer system 2300 may include one or more processors 2310. The processor can be programmed to perform the functions described herein. Processor 2310 can receive data from a number of data sources 2322a, 2322b . . . 2322n, which may be separate data sources, portions of the same data source or any other configuration.

According to an embodiment of the invention, any of data sources (2322a . . . 2322n) may be, include, or interface to, for example, the Oracle™ relational database sold commercially by Oracle Corporation. Other databases, such as Informix™, DB2 (Database 2) or other data storage or query formats, platforms, or resources such as OLAP (On Line Analytical Processing), SQL (Structured Query Language), a SAN (storage area network), Microsoft Access™ or others may also be used, incorporated, or accessed into the invention.

One or more input devices 2320 may be used to provide input and control information to processor 2310, and may comprise a keyboard, mouse, track ball, light stylus instrument, etc.

The computer system 2300 is operative to generate tangible output. These outputs can be received by various components such as printer 2350, display 2360 (such as a monitor), or other output devices 2330. As further illustrated in FIG. 2C, processor 2310 can produce a user interface (UI) 2340. This UI can be viewed at any location (proximate or remote to processor 2310) that receives the output of processor 2310.

User Interface. According to an embodiment of the invention, UI 2340 may include or otherwise correspond to a software program, such as a java applet, used to produce enhanced box charts. More elaborate software can be used as desired. Alternatively, a separate software module or add-on can be included in or with any conventional software application such as Microsoft Excel to produce enhanced box charts.

Figure 2D:
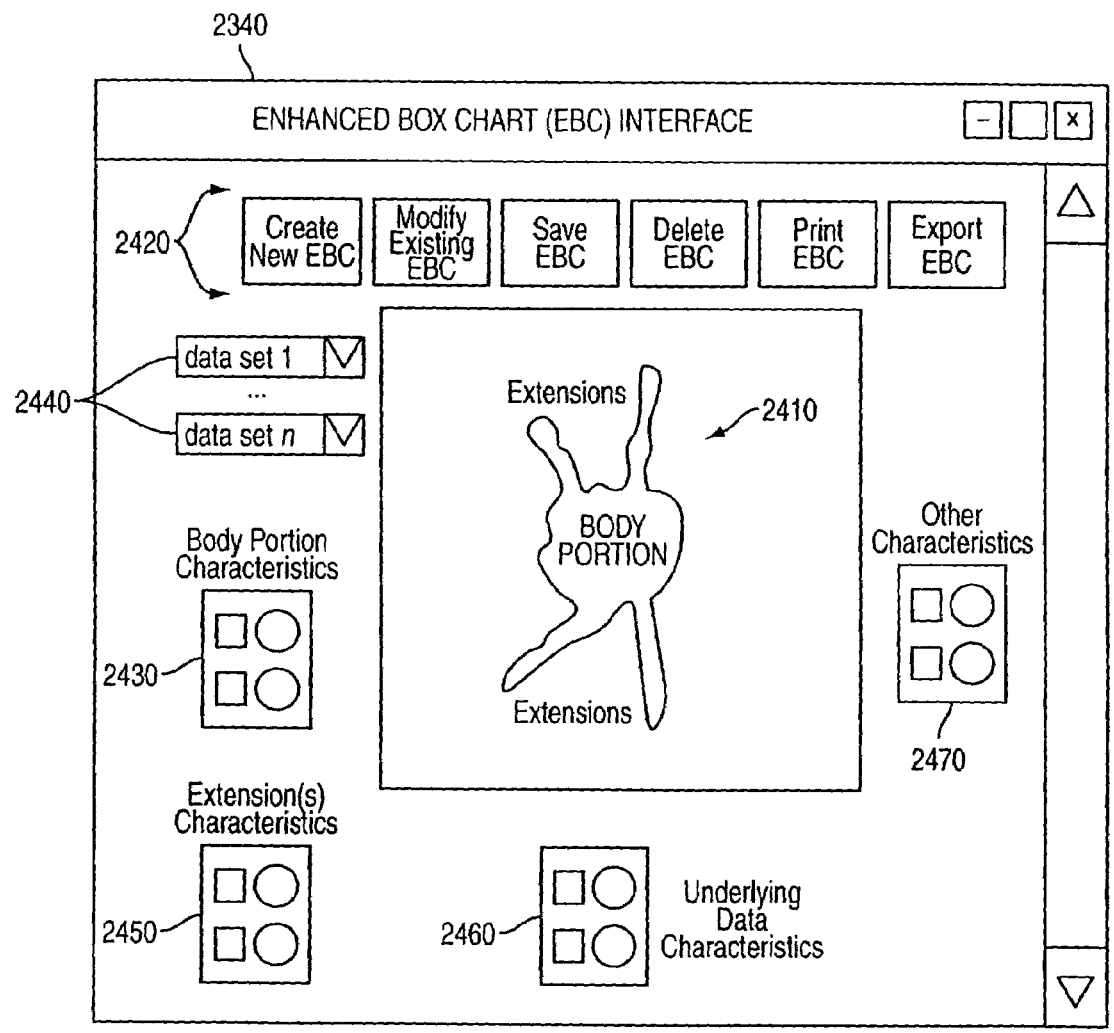
FIG. 2D illustrates an example of a user interface, according to an embodiment of the invention.

According to an embodiment of the invention, UI 2340 provides a tool that enables a user to select any of the aspects of one or more enhanced box charts. Such selections may include, without limitation, one or more data sets (from any suitable data source) or portions thereof for display, and the various aspects of the display, including the number of enhanced box charts to display, the number of and attributes of each body portion, extension and sub-element. Additionally the user may select what data or portion of data corresponds to each component of each enhanced box chart. Various templates may be provided, created, or modified to facilitate a user's selection of the various display choices. FIG. 2D illustrates one example of UI 2340; others may exist. Just as enhanced box charts may be customized for different applications, so to may user interfaces. As such, FIGS. 20 and 21, described in detail below, illustrate two additional examples of customized user interfaces.

As illustrated in FIG. 2D, UI 2340 may include various user-selectable and/or user-definable controls. As may be described herein, it should be understood that the term "controls" may broadly refer to a "button," "pull-down menu," "tab," "click-box," "check-box," "hypertext link," "hot link," or other user-selectable portion object or navigational tool that may enable users to select, access, display, or navigate through the content displayed on UI 2340.

According to an embodiment of the invention, an array 2420 of user-selectable and/or user-definable function controls may be provided for enabling a user to, for example, create a new enhanced box chart, modify an existing enhanced box chart, save a new or revised enhanced box chart, delete an enhanced box chart, print or otherwise output an enhanced box chart, and export an enhanced box chart to one or more applications (e.g., Microsoft Word™ document, PowerPoint™ presentation, etc.). Other user-selectable or user-definable functions may of course be implemented. A pane, frame, view, window, or other display 2410 within UI 2340 may illustrate an enhanced box chart as user operations are being performed. A legend or other indicia may be included in the pane, frame, view, window, or other display 2410 or elsewhere to facilitate interpretation of the display. Additionally, text, legends or other information be displayed when a user "points to" (e.g., via a mouse or other pointing device) a portion of the enhanced box chart.

According to an embodiment, UI 2340 may comprise an array 2440 of data controls for enabling users to select one or more data sets (from any suitable data source) or portion thereof for display. Such data may include, but not be limited to data in a database, a spreadsheet (e.g., Excel) or other data source. The data fed into a software application associated with UI 2340 may be the same as that needed to produce a mean, a histogram, a box chart or other statistical or functional graphs, charts or displays. That is, the same raw data that is fed into any system to produce various meaningful data can be used in the invention. Techniques for the actual calculation of such information is well known in the art and will not be described in detail here. Similarly, once it is specified by the user what is to be displayed and how, the actual generating of enhanced box charts is analogous to the production of standard box charts or candlesticks along with supplementation of other sub-elements, etc. The known techniques for producing standard box charts or candlesticks along with other graphical generation techniques may be used as well.

A user may access an array 2430 of body portion controls to further select the number and shapes (and other characteristics) of the body portion of the enhanced box chart, while an array 2450 of extension controls may enable a user to define the number and shapes (and other characteristics) of the extensions of the enhanced box chart. The controls shown are for example only. More or less may be used in particular circumstances. Various sets of controls may be stored for different applications, and if desired, certain components may have different default values for different applications. For example, different control sets/defaults may be provided for student report cards, stock price analysis, portfolio analysis, employee evaluation, or any other application.

In any of a plurality of capacities as defined by a user, portions of the enhanced box chart can be flexibly defined, via an array 2460 of controls, to convey particular attributes of the underlying data. For example, an attribute of the underlying data can be represented by the thickness, relative length, or color of one or more lines in the chart. These lines may or may not represent the lines that give primary definition of the shape of the body portion(s) and the extensions.

Other characteristics, such as the sub-elements to be displayed, additional attributes of the body portion(s) and extension(s), and axes or other designators (and characteristics thereof) may be further defined by a user through an array 2470 of additional controls.

According to an embodiment of the invention, software associated with UI 2340 permits calling up any combination of enhanced box charts for single or comparative viewing. As with other java graphs, as the pointer is moved across an enhanced box chart, precise value reading, zooming, etc. can be done.

Enhanced box charts with time as the horizontal axis can be viewed with the chronological enhanced box charts in any timeframe for which raw data is available. Enhanced box charts can be viewed in simple, logarithmic, static, moving (e.g., moving average, moving standard deviation) or other formats.

Reader. In general, enhanced box charts can be viewed and manipulated in a multitude of ways. In one embodiment, an independent enhanced box chart reader (or viewer) is used. In general, a reader (or viewer) can be any device or software or process that can show and/or manipulate one or a whole series of enhanced box charts. In one embodiment, the reader (or viewer) can also display or otherwise manipulate non-enhanced box chart data necessary or desired in gleaning information from enhanced box chart(s) singly or in comparative studies. The enhanced box chart reader (or viewer) can be similar to any commonly available reader (or viewer) like Adobe Acrobat, which reads *.pdf files, or *.jpeg or *.gif viewers, which view pictures. In operation, a user inputs raw data into the system and defines the fields or sets the criteria for her particular area. Alternatively, data can be imported from another source, e.g., Microsoft Word.

In a second embodiment, an enhanced box chart module is attached to, or its software code is integrated into, already functioning software that can manipulate raw or input data and generate a variety of calculated or manipulated data (statistical or otherwise) in the forms of tables, various charts like histograms, pie-charts, etc. This software can be general-purpose software like Microsoft Excel, or special-purpose software like PeopleSoft HR (Human Resources) line of software, where enhanced box charts can become an effective tool in employee evaluation. As would be appreciated a combination of the two embodiments can also be used.

EXAMPLES

Figure 3:
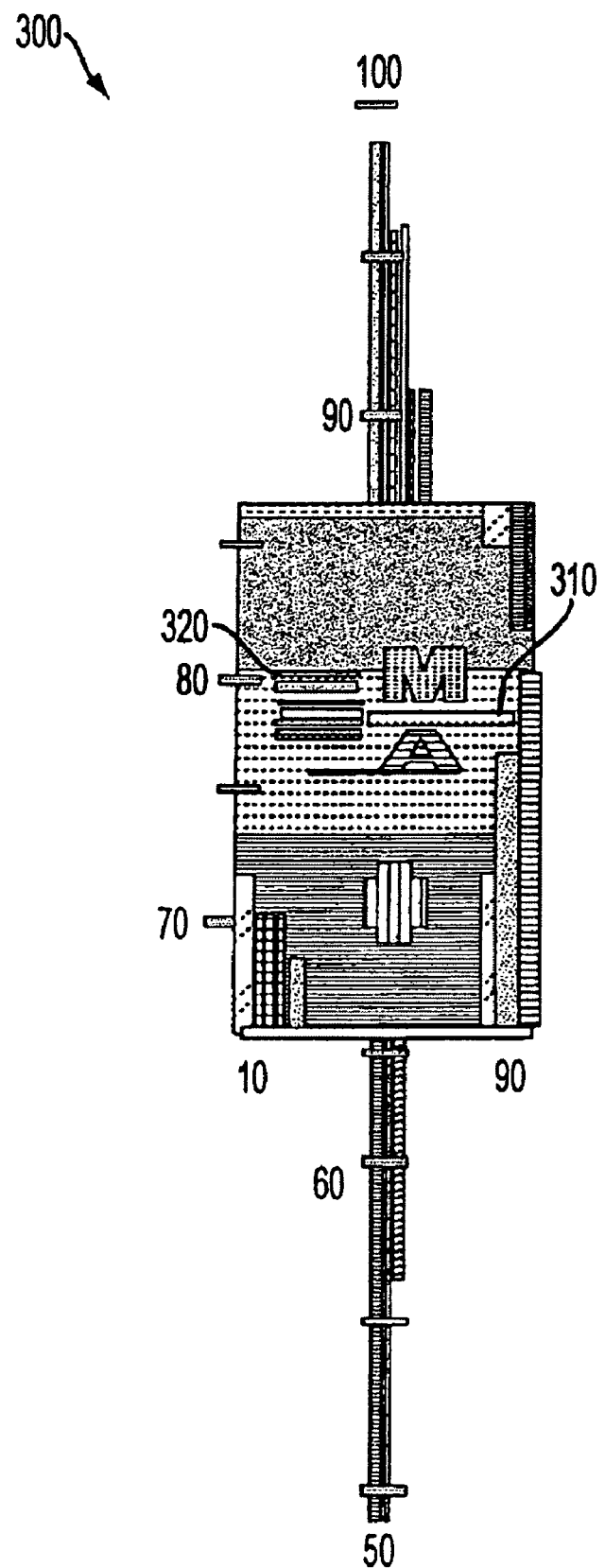
FIG. 3 illustrates an example of an enhanced box chart that is used to graphically display the data for a class report card.

FIG. 3 illustrates an example of enhanced box chart 300, which is used to graphically display the data for a class report card. Here, a particular student's grade is marked with horizontal line 310. As illustrated, enhanced box chart 300 is designated with a red-cross logo. Enhanced box chart 300 includes three sub-groupings of the population: Ethnic A (green), Ethnic B (pink), and Ethnic C (blue). Enhanced box chart 300 also includes measures for the overall median (M) and the average (A).

As further illustrated, the area (or width) of the body portion of enhanced box chart 300 covers 10 to 90 (percentile or absolute number) of the bell curve. As indicated by the relative widths of the upper and lower edges of the body portion, there are more samples around the median value (see indication of median dispersion on upper edge of the body portion) than around the mean value (see indication of mean dispersion on lower edge of the body portion). Further information regarding the underlying data is conveyed through the use of lines along the sides of the body portion. Specifically, grades below the mean are at the lower left of the body portion, grades below the median are at lower right of the body portion, and grades above the median are at the upper right of the body portion. Finally, the thickness and length of the lines in the extension areas of enhanced box chart 300 indicate grades outside of the 10 and 90 percentile points defining the body portion.

Figure 4:
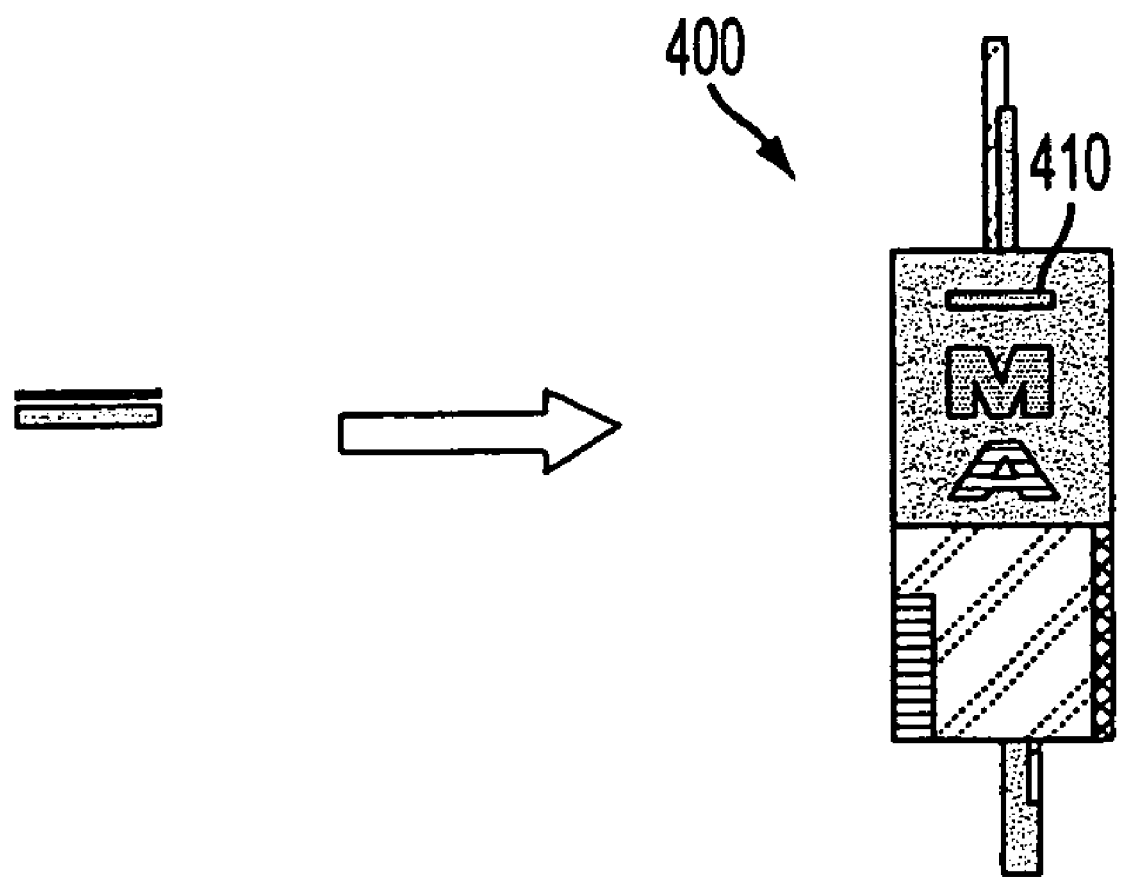
FIG. 4 illustrates an example of an enhanced box chart that is produced when a particular ethnic is selected.

In the context of a graphical user interface, various display elements of enhanced box chart 300 can also function as interactive elements. For example, by selecting (or "clicking" on) element 320, enhanced box chart 400 of Ethnic A is displayed, wherein gender composition and other attributes of Ethnic A are displayed (see FIG. 4). In this second enhanced box chart 400, the student's grade can be similarly conveyed in this new environment using horizontal line 410. If desired, a user can drill down even further into the data. For example, by selecting the pink area (girls) of enhanced box chart 400, a further enhanced box chart of the girls' grades is displayed. The student's grade could similarly be displayed in the context of the girls-only environment. As would be appreciated, this process of drilling into the underlying data can proceed in any combination or permutation as desired by a user.

Depending on the field or trade or the specific purpose, any of the attributes can be ignored, combined, modified and the like. Additional attributes can be added as needed. Attributes can change instantaneously. For example, as described above, the selection of the pink area (girls) of enhanced box chart 400 initiated a transformation from an ethnic composition to a gender one. It is a feature of the invention that the flexibility of the system enables a user to consciously or subconsciously ignore, combine or modify many parameters even in a fully marked enhanced box chart.

Enhanced box charts can also operate as a stand-alone display system. For example, in any performance based system such as education (grades) or industry (employee evaluation), enhanced box charts can be given to the subject, or put in her chart, in lieu of a simple, single grade.

Figure 5:
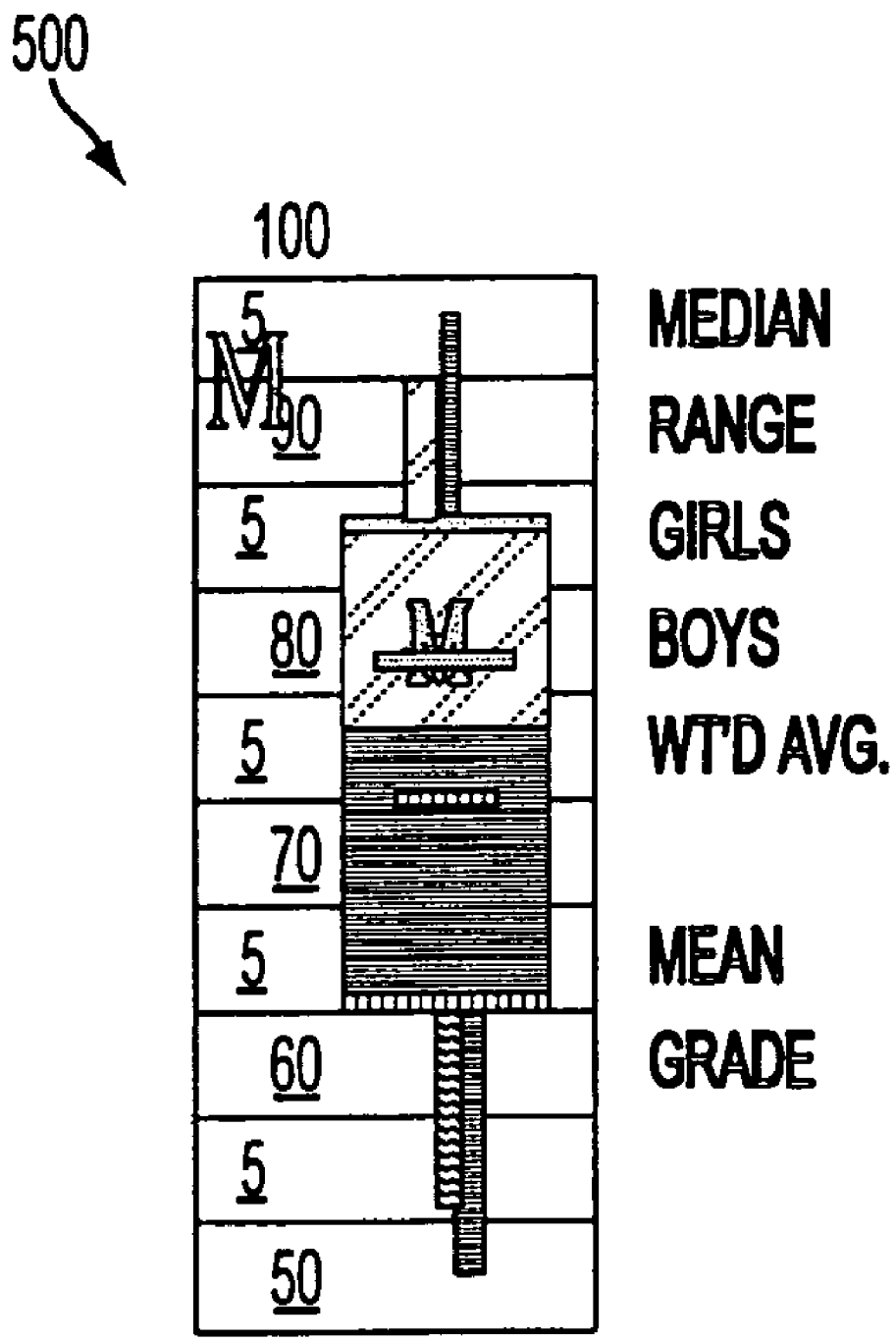
FIG. 5 illustrates an example of an enhanced box chart that can be included in a report card given to a student.

FIG. 5 illustrates an example of an enhanced box chart that can be included in a report card given to a student. As illustrated, enhanced box chart 500 enables the parents of the student to understand the context of a student's grade in view of the relevant student population.

Figure 6:
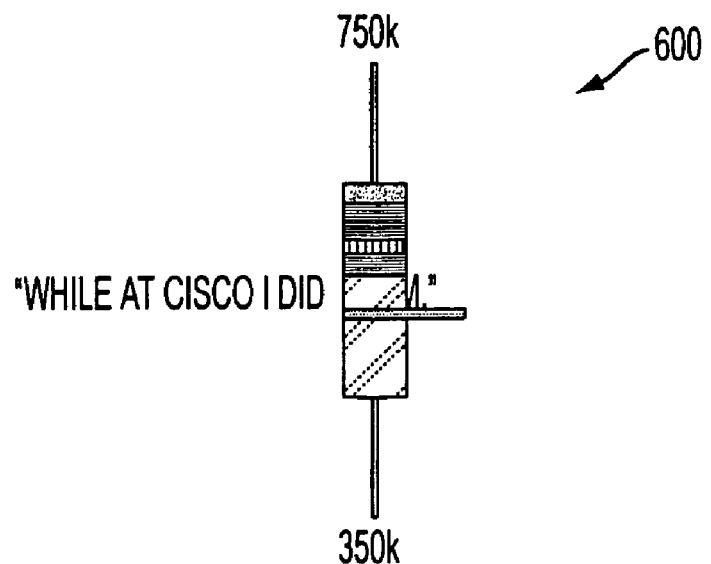
FIG. 6 illustrates an example of an enhanced box chart included in a written language.

The ability of an enhanced box chart to enable a quick and intuitive understanding of the details of a distribution allows the enhanced box chart to be used in non-graphical styles of communication. For example, enhanced box charts can be used as part of a written language. In this context, as a field or trade establishes its own enhanced box chart, the enhanced box chart can become part of its vocabulary. The sentence of FIG. 6, which includes enhanced box chart 600, can then be used as part of a job resume. It should be noted that, for display in a written language, enhanced box charts can be rotated 90 degrees (or any other user-defined number of degrees) to make the enhanced box chart more aligned with the written text. A horizontal enhanced box chart may flow more smoothly with the text while conveying the same information.

In the "language" of sales professionals, enhanced box chart 600 could signify that: a) the best sales person sold $750,000/year; b) the worst salesperson sold $350,000/year; c) the median (M) sales figure was $480,000; d) the mean (in red) sales figure was $550,000; e) the lower 90 percentile was $400,000; f) the high 90 percentile was $600,000; g) the 90% bell curve for the sale was fairly typical with lower and higher cutoff points at $400,000 and $600,000; h) the thickness of the upper extension relative to the lower one signifies that twice as many salespeople achieved the top sales figure than the bottom one; i) the color pink and blue signify the relative ratio of women to men salespeople; j) that the applicant (thick black line at the top of the "bell curve") was at the top 90 percentile with $600,000 of sales per year; and k) the width of the body portion signifies the length of time the applicant worked at the company. All this information is available at a glance, without having to resort to tables or bell curves, or long paragraphs or explanations.

Figure 7:
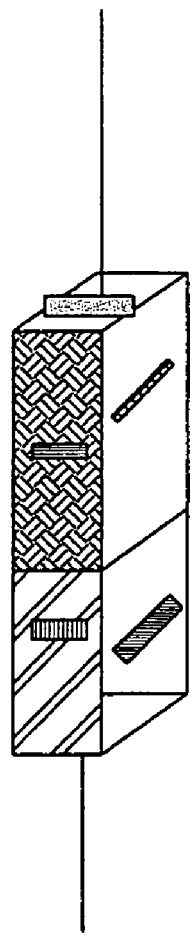
FIG. 7 illustrates an embodiment of a three-dimensional enhanced box chart.

For additional data display in an extra dimension, enhanced box charts can be utilized in a 3-D format. As illustrated in FIG. 7, additional sides can represent additional independent data, or it (they) could be subset(s) of the front enhanced box chart, or a combination thereof.

Figure 8:
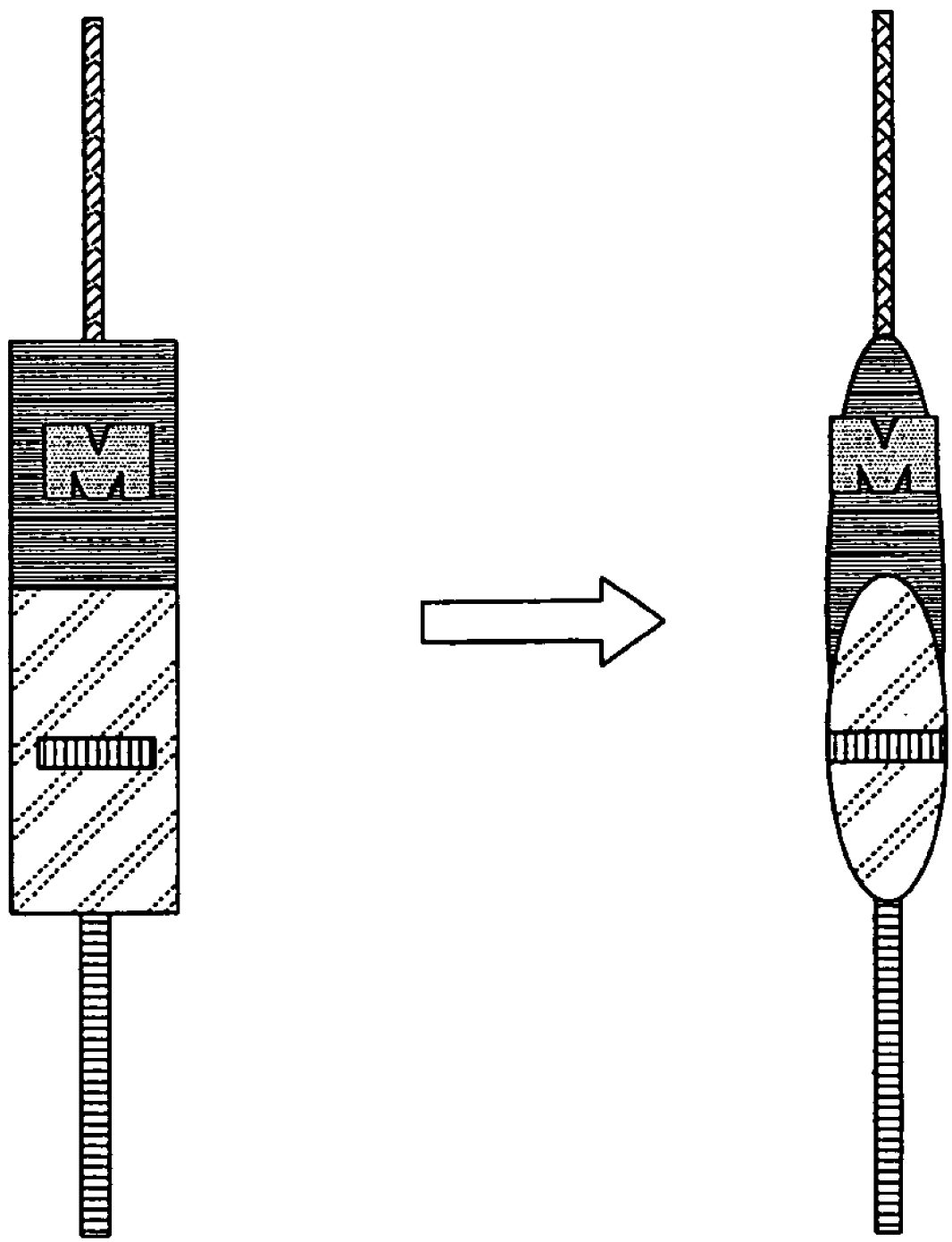
FIG. 8 illustrates an embodiment of an enhanced box chart having an alternative shape.

In a specific field or trade, it may be more desirable to use variations of enhanced box charts. Such variations can take many forms. These alternative forms may be utilized, for example, in some scientific research. FIG. 8 illustrates an alternative presentation of an enhanced box chart. Here, the ellipse may provide additional data for more comprehension and feel by "echoing the shape" of the underlying distribution (e.g., bell curve).

According to an embodiment of the invention, enhanced box charts can easily represent normal distributions or bell curves, the most widely used statistical representation. Enhanced box charts can be used to represent bell curves for presentation and for visual comparison of many bell curves all in one place, and at one glance. This eliminates the awkward and sometimes impractical task of viewing many bell curves for single viewing with many additional components; or for viewing for comparison purposes to deduce both a quantitative comparison and a comparative "feel" of many bell curves.

Figure 9A:
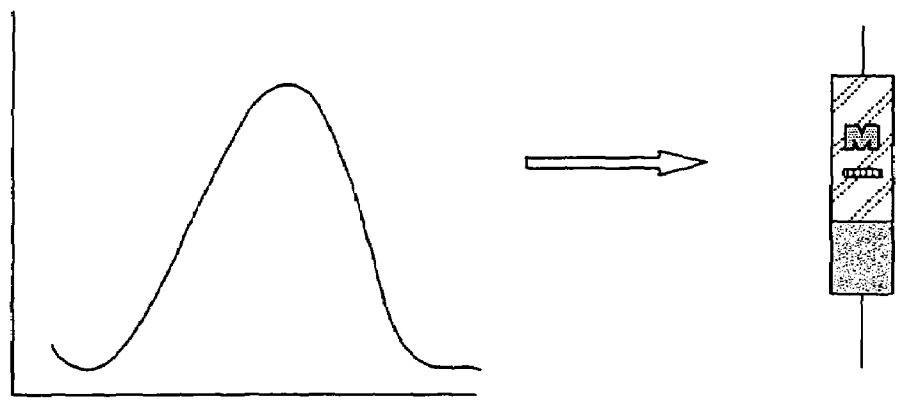
FIGS. 9A–9C illustrate enhanced box charts for various bell-curve shapes.
Figure 9B:
Figure 9C:
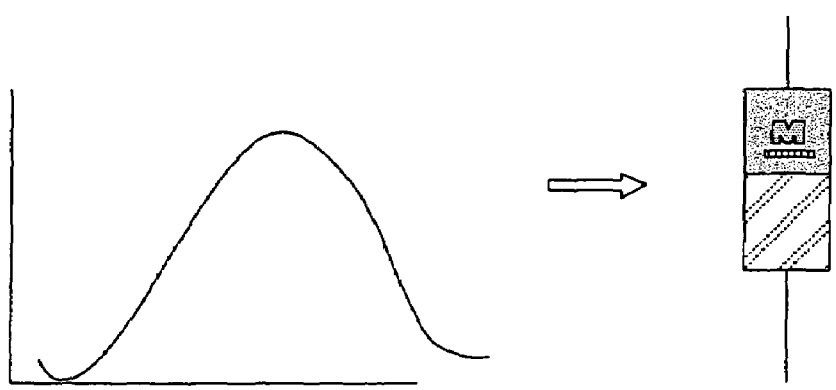

FIGS. 9A–9C illustrate enhanced box charts for three bell curves having a moderate, steep, and gentle curve, respectively. The area of the body portion of an enhanced box chart corresponds to 95% (or any user-defined value) of that under the bell curve. The upper and lower sides of the body portion of the enhanced box chart correspond to 95% and 5% (as default) of the high and low of the bell curve (or other user-defined percentages or absolute values). The upper and lower extensions represent the extremes of the lower and higher ends of the bell curve, (e.g., the range). Partial lengths of the extensions and of the sides of the body portion can provide information for either some or all aspects of a bell curve.

Figure 10A:
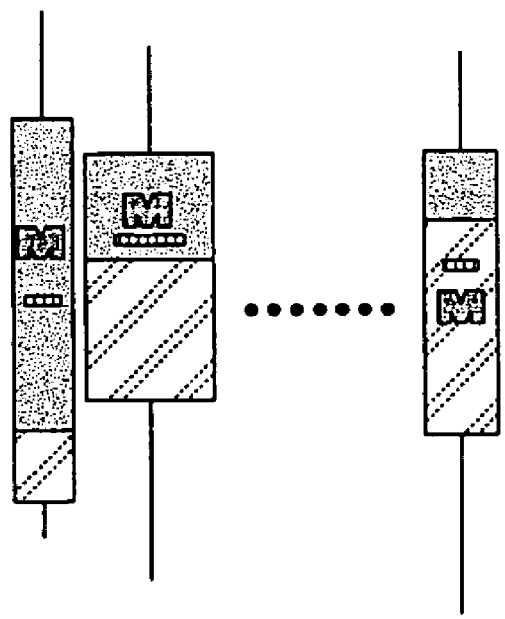
FIGS. 10A–10B illustrate a display of adjacent enhanced box charts in a manner that facilitates a quick comparison.
Figure 10B:
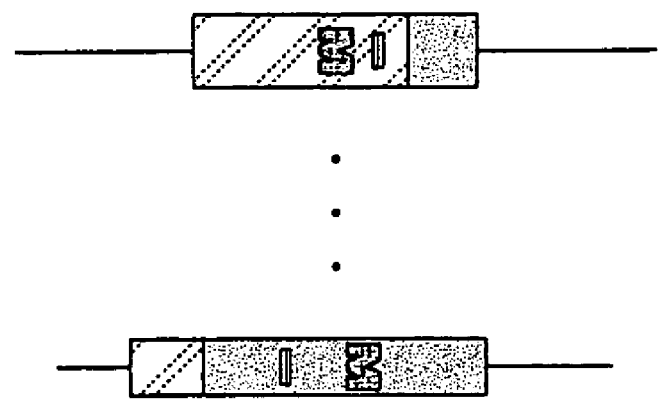

FIG. 10A illustrates the display of adjacent enhanced box charts in a manner that facilitates a quick comparison. Bell curves can also be compared by enhanced box charts horizontally (see FIG. 10B). The enhanced box chart's flexibility allows a user to set the width (now the height) of the enhanced box chart to correspond to the height of the bell curve to get an instantaneous feel of multiple bell curves under study. Additionally, if desired, enhanced box charts can be tilted to any degree, for example, to correspond to the angles of curves that are being represented by enhanced box charts.

Figure 11:
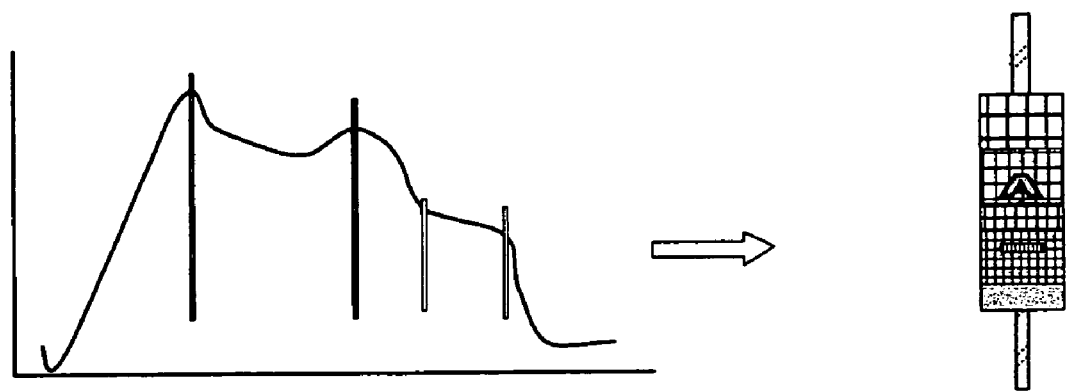
FIG. 11 illustrates a general curve represented by an enhanced box chart
Figure 12:
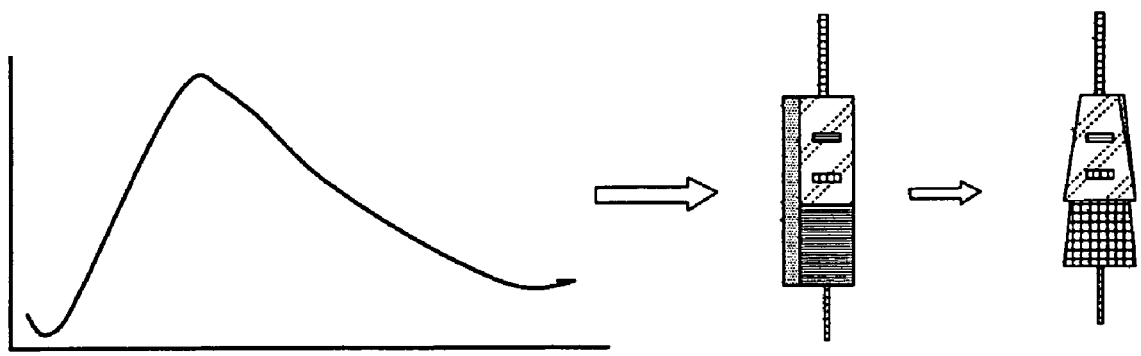
FIG. 12 illustrates a skewed distribution represented by two alternative enhanced box charts.

Enhanced box charts can also be used to represent other (non-normal distribution) curves. If data samples produce a curve different from a bell curve, the area under the curve can be represented by an enhanced box chart. The area of the body portion can represent the two user-defined values (absolute or percentile) and various color areas represent various user-defined points of interest. Comparison between multiple curves is similar to that of bell curves. Bi-polar or multi-polar distribution curves can be represented by enhanced box charts with user-defined horizontal or vertical designations. For example, FIG. 11 illustrates a general curve represented by an enhanced box chart, wherein various color areas of the enhanced box chart represent various user-defined points of interest. FIG. 12 illustrates a (positively) skewed distribution represented by two alternative enhanced box charts.

Enhanced box charts can also be used in comparative studies. For instance, enhanced box charts can be used with both mean and standard deviation, as well as with moving average (MA) and moving standard deviation (MSD). MA is the principal measure in the central tendency considerations for a given timeframe in a continuously updating chart. Standard deviation is a measure of how samples are dispersed around a mean. A MSD is a measure of how samples are dispersed around a MA.

In a comprehensive, continuous measuring system, measurements in the form of enhanced box charts may be drawn with a MA running through them. User-defined MSDs may then be drawn above and below the MA to encompass some 90% of the enhanced box chart (90% is the default value, as in case of other data it is user-defined). This visually graphic presentation provides the viewer with a continuous progression of all the information contained in the moving enhanced box charts, compares them with MA (or other user-defined central tendency parameter) and provides a measure of the relative low and high of the enhanced box charts. As such, a graphic system is provided that depicts the absolute value highs and lows of the parameters under measurement, while enabling a viewer to measure at a glance the relative values of the parameters or functions.

Figure 13:
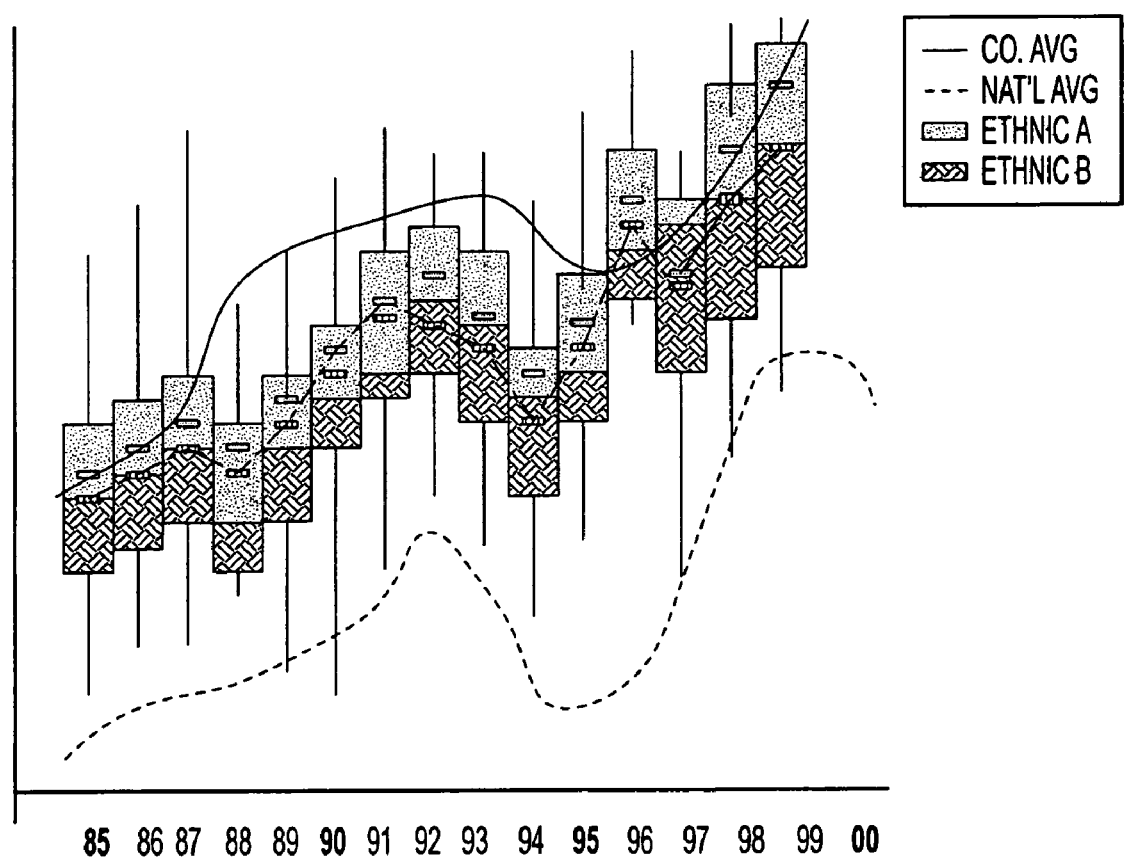
FIG. 13 illustrates the use of enhanced box charts for a continuous measurement system.

In an exemplary embodiment, FIG. 13 illustrates the shooting score of hypothetical Army "Company A" over a 15 year period. Additional attributes can be added as needed. At a glance, the progress of Company A can be seen and compared to itself, as well as to all of the Army companies whose scores are being considered. A standard deviation of ±2 above and below the enhanced box charts provides for rapid comparison.

For example, in 1996, Company A probably won a medal, whereas in 1998, even with a higher "absolute" score, the performance of Company A was good, but not outstanding.

In 1993, Company A's performance was much worse than in 1985, even though its absolute score was 20% higher. Its score in 1985 was relatively "higher" than in 1993 because it was much closer to the top SD line.

1990 was a sub-par year for Company A, yet it received the most uniform training of all the years (e.g., the "body portion" of the enhanced box chart is the shortest). Also, Company A may have had some very good and bad shooters in one place.

Conversely, 1998 was a good year for Company A, yet the training was one of the most non-uniform of the past 15 years (e.g., the body portion of the enhanced box chart was unusually long). All of this comparative information (in addition to other information), is readily visible from the enhanced box chart graph. It is a feature of the invention that this presentation eliminates separate graphs, tables, or long written reports to glean the same information.

Figure 14:
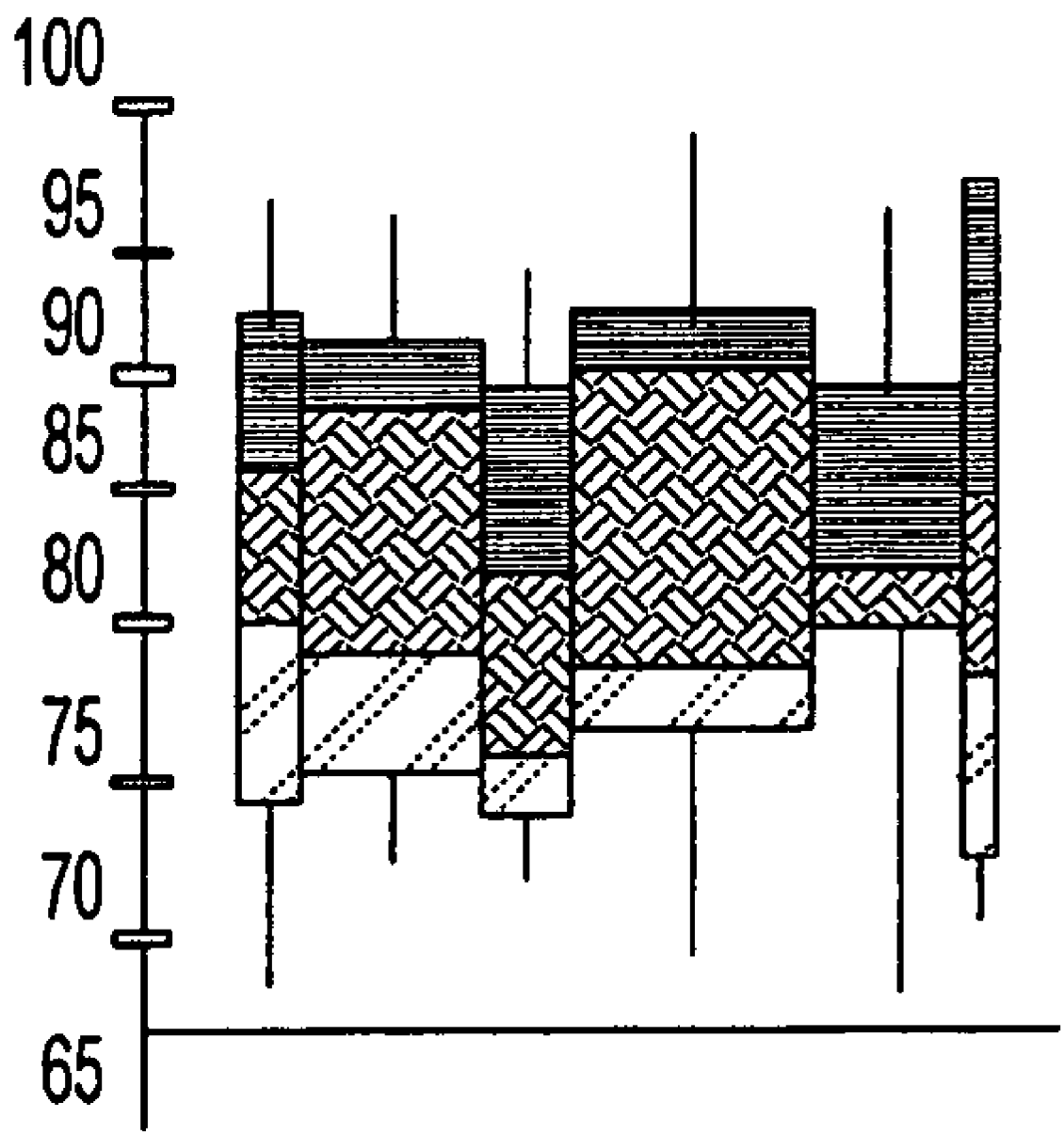
FIG. 14 illustrates an example of enhanced box charts replacing box charts.

According to various embodiments, enhanced box charts can (in many ordinary applications) be more accurately and easily substituted for point charts, histograms and box charts because of the enhanced box chart's ability to add other dimensions or attributes, such as variable widths or partial lengths. FIG. 14 illustrates an example wherein enhanced box charts (replacing box charts) provide additional dimension and "feel" to the area under the bell curve. As would be appreciated, additional attributes can be added as needed.

According to one embodiment, enhanced box charts can be used in financial analysis. As noted, Japanese candlesticks are the most widely known and used special-purpose box charts employed in technical analysis of financial markets. Enhanced box charts can supplant candlesticks in technical analysis by conveying more information and speeding up comprehension, thus providing an edge for traders in various time frames.

Figure 15A:
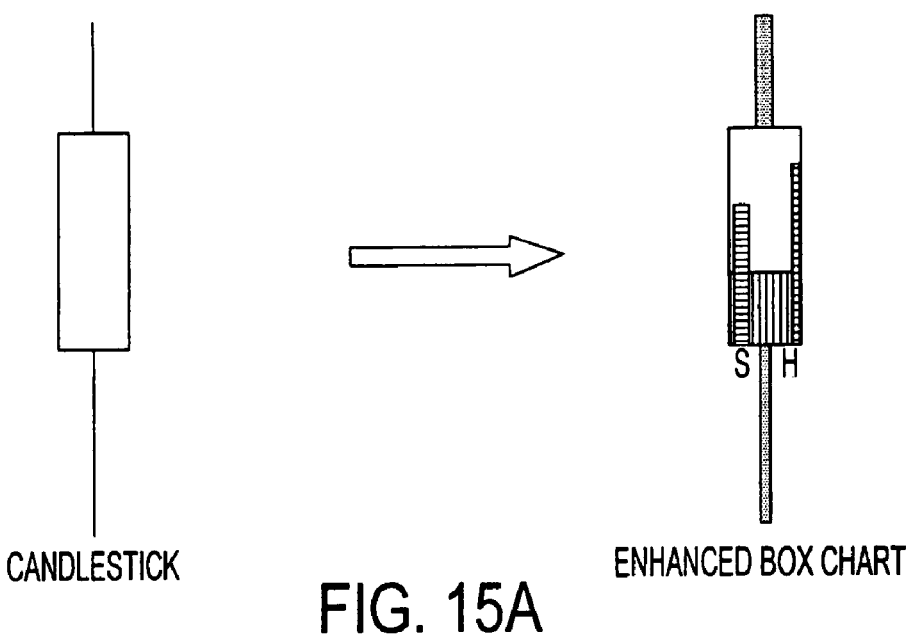
FIGS. 15A–15B illustrate a comparison between enhanced box charts and candlesticks.
Figure 15B:
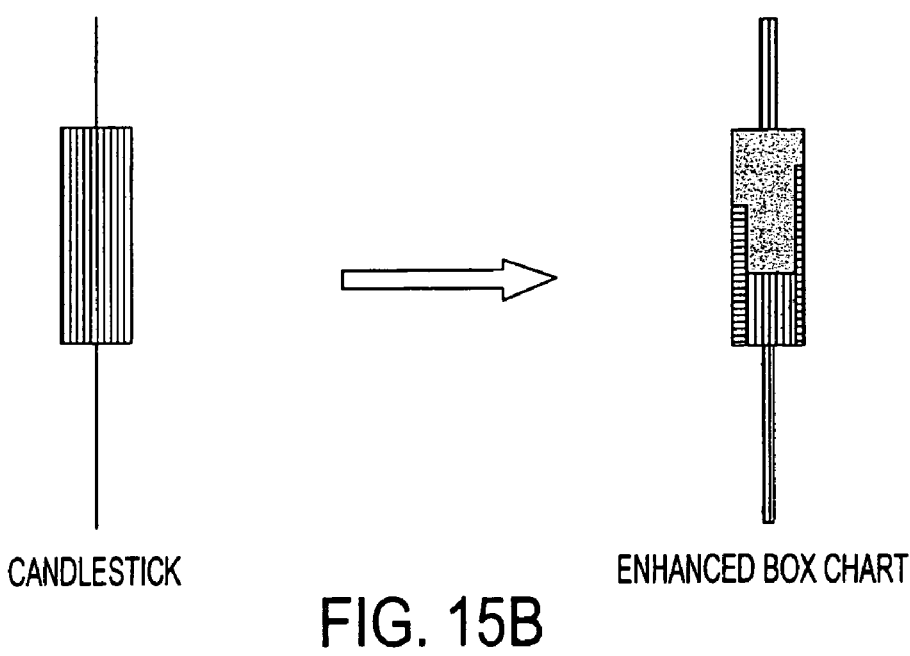

Generally, a candlestick conveys high, low, open and close prices of a commodity (such as a share price) in a certain time frame. An enhanced box chart, in the same space, may convey more information, all user-defined. In the examples of FIGS. 15A ($P_{open}<P_{close}$) and 15B ($P_{open}>P_{close}$), the thickness of the extensions illustrated may represent volume. It may also be readily apparent to the eyes that the high price had a greater volume (by approximately 3×) than the low price. The up volume in this bar was greater than the down volume (the green area is larger than the red one). The stochastic, S, is in the overbought region. The MACD Histogram, H, is very positive. These and other technical indicators, all user-defined, can be displayed by enhanced box charts.

Figure 16:
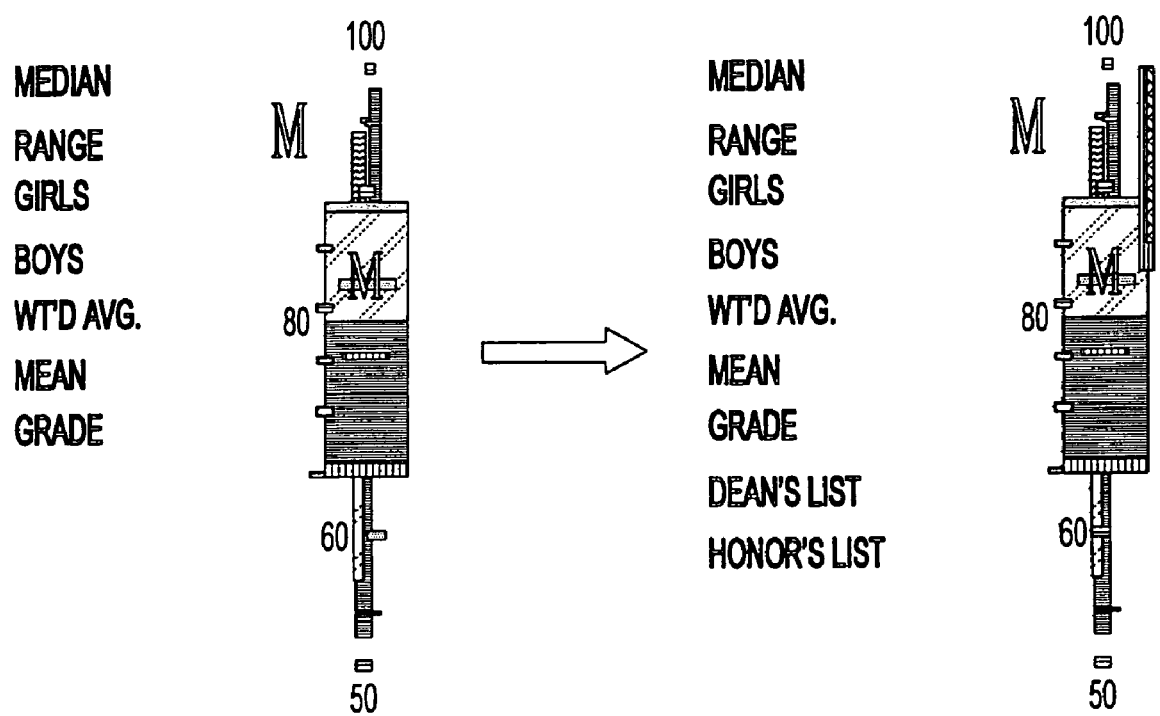
FIG. 16 illustrates an example of an enhanced box chart and multiple ranges.

Enhanced box charts can also be used to indicate a sample within multiple ranges. A corollary to this ability is that a range can also be viewed within (or compared in) multiple ranges. A second corollary is the general ability of an enhanced box chart to enable a user to quickly and easily compare a sample against multiple frames of reference or multiple yardsticks. (A range being viewed as two simultaneous frames of reference.) In addition to providing precise measurements in these various frames or yardsticks or ranges, an enhanced box chart gives a "feel" that in many instances could be enough to form an opinion or make a decision. An example of an enhanced box chart and multiple ranges is provided by FIG. 16.

Figure 17:
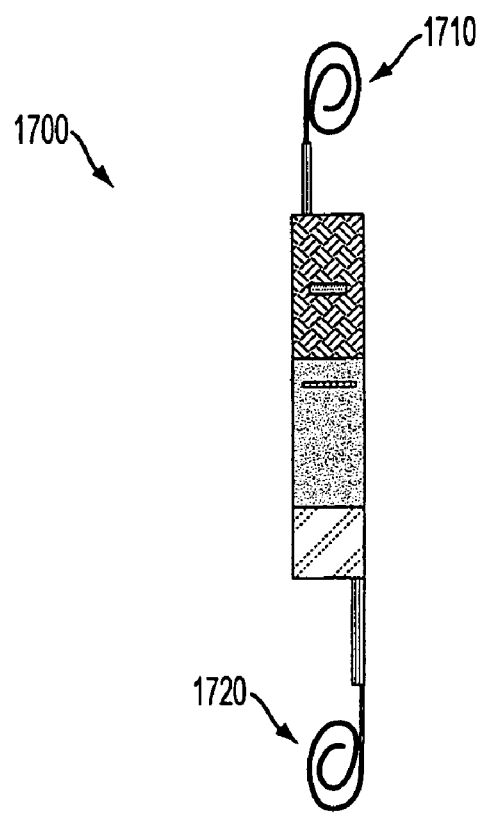
FIG. 17 illustrates an example of a display of outliers.

Outliers. In conventional displays, outliers are often "cut-off" in some manner because they disproportionately occupy space in graphs. The process of "cutting-off" the data prevents a user from gaining any physical understanding of the relative value of the outlier compared to other regular data. According to an embodiment of the invention, enhanced box charts overcome this drawback by depicting outliers in a presentation as a spiral, curl, or other configuration. FIG. 17 illustrates enhanced box chart 1700 having spirals 1710 and 1720. The relative position of outlier spiral 1710, 1720 on enhanced box chart 1700 indicates where the outlier occurred. The partial, color-coded thickness(es) of the spiral is a measure of outlier samples. In an interactive medium, a pointer controlled by a device (e.g., a mouse) may "uncurl" a spiral to get a better visual sense of the outlier, and then allow it to resume its curled configuration after the observation is complete.

In other embodiments, an outlier may be represented by curly, zigzagged, folded, twisted, or accordion-like collapsed lines. The length of these collapsed lines can correspond to the value of the outlier. This enables a user to get an immediate physical understanding of the size, magnitude, etc. of the outlier data sample. In an interactive embodiment, a collapsed line may be "lifted" to enhance viewing, and then returned to its original configuration after the observation is cpeslete.

According to an embodiment of the invention, to display additional data, complete or partial enhanced box charts may be overlaid transparently or translucently, juxtaposed adjacent to one another, or otherwise displayed. For example, a student's enhanced box chart showing gender composition can be translucently overlaid with just ethnic composition for simultaneous viewing, either transiently or permanently.

Enhanced box charts may also be used in fractal representation. According to an embodiment, one feature of an enhanced box chart is its ability to represent any user-defined fractal enhanced box chart down to a single data sample. For example, if n=number of attributes, then in a histogram, n=1. In a box chart, n=5. In an enhanced box chart, n may be user-defined. As n→∞, it may become more desirable (or practical) to segment some parts whereby, by clicking (or hovering) on that segment, a new enhanced box chart is displayed. This process can proceed in a fractal manner in any user-defined combination or permutation.

Similarly, by clicking (or hovering) on any attribute in an enhanced box chart, a new user-defined enhanced box chart about that attribute can be displayed. Again, this process may proceed in any combination or permutation defined by a user.

According to an embodiment of the invention, interactive elements in an enhanced box chart may enable users to access further charts. These further charts may convey a subset of the information being displayed on the first chart, or a view of a new combination of data. This navigation feature may enable users to quickly and intuitively gain an understanding or "feel" of the meaning of the underlying data by drilling down, drilling up or drilling sideways through the data.

In operation, an "administrator" assigns a "n" to any pre-defined user or user-group (much as leveled security clearances are given to various people in an organization to access data). By way of example, in a university setting, the enhanced box chart may represent student grade data. The president and her "cleared" staff have access to n, unlimited and in any defined combination or permutation. The dean has access to his own college, in any defined combination or permutation. The department chairs, teachers, students, parents, or public can have access in their area only in combinations and permutations allowed by the administrator in this fractal representation. Likewise, financial data in a public company can be "fractalized" in various user-defined enhanced box charts and people from the CEO down to shareholders and public have each an assigned, particular "n" with defined combination or permutation of that "n".

Fractal enhanced box charts can move in all directions, including skipping or jumping over several levels. "n" can move in both directions: a histogram can fractally expand to a complete enhanced box chart, and a complete enhanced box chart can collapse into a histogram in a fractal manner through any user-defined combination or permutation.

The enhanced box chart has the potential to become a kernel of the emerging information society and its knowledge-based economy by increasing quantitative and objective understanding, thereby increasing productivity and efficiency for further advancement of the society.

Figure 18:
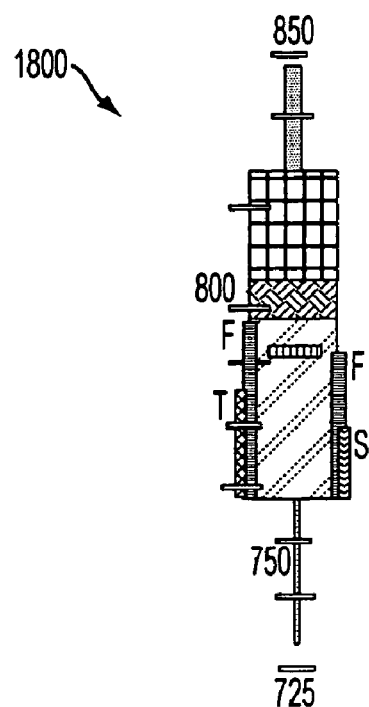
FIG. 18 illustrates an example of the use of enhanced box charts.

A further example is provided in FIG. 18, which illustrates a portfolio for a company (for convenience referred to as Company A). The portfolio includes Stocks, Cash, and Bonds in $B for a selected time frame (e.g., decade, year, month, week, day, hour, x-minutes, or other user-defined time frame). This enhanced box chart shows Min, Open, Close, Max of the portfolio value. It also shows the mean value (Po+Pc)/2 as horizontal line 1810. Enhanced box chart 1800 also shows the relative performance of the portfolio vs. S&P500 (at right) and 10-year Treasury Bond (left). The thicknesses of the extensions indicate the number of days (or user-defined time period) that the portfolio was above or below the open and close values. Other attributes can be added as needed. By clicking on the pink section (Bonds) the enhanced box chart performance of the Bonds "sub-portfolio" can be displayed. This fractalization can proceed up to every single bond in Company A's portfolio in any combination or permutation defined by a user. People would be assigned various n's, indicating the level of combination/permutation of data that they are authorized to access. If Company A's portfolio lost money during the enhanced box chart period, the extension lines may be shown in Red.

Figure 19:
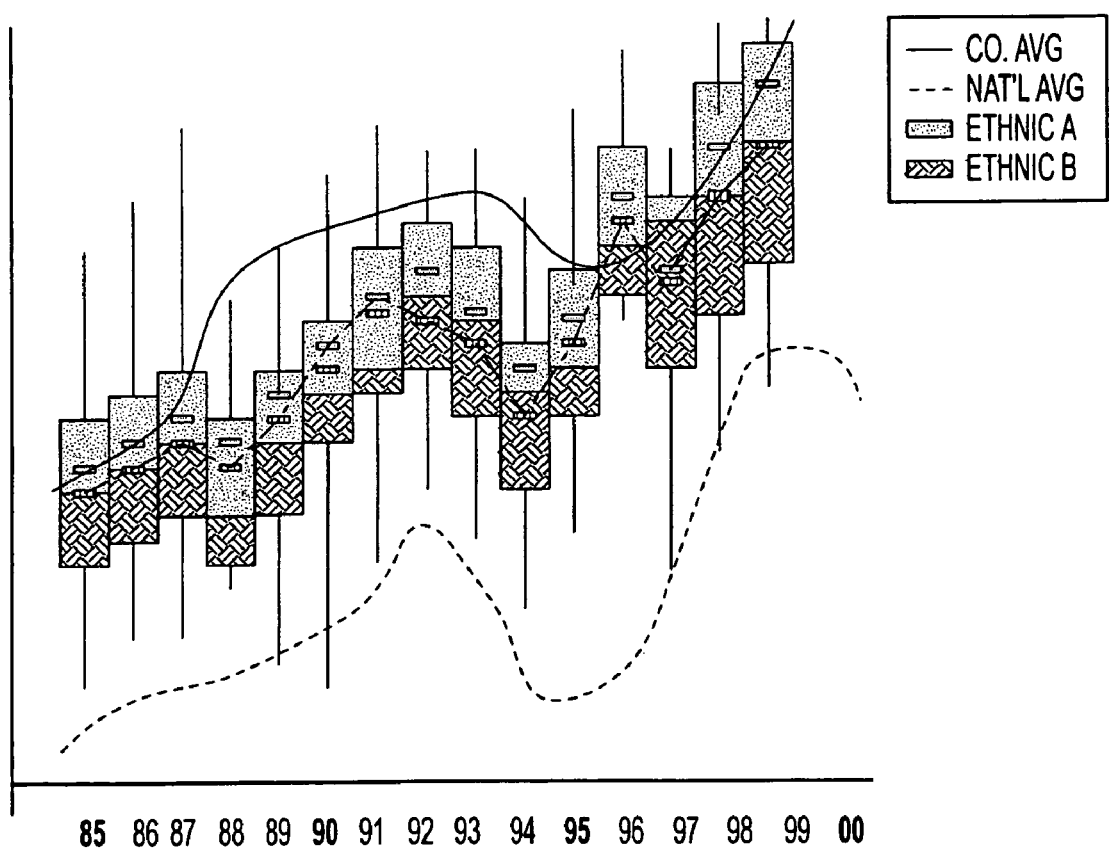
FIG. 19 illustrates an example of the use of enhanced box charts.

Company A's portfolio performance can be visually compared for any time frame using the methodology outlined in FIG. 19. FIG. 19 illustrates Company A's performance compared against the national GDP over 15 years. Additional attributes can be added as needed. The blue line is the average GDP with ±2SD.

STUDENT EXAMPLE

Figure 20:
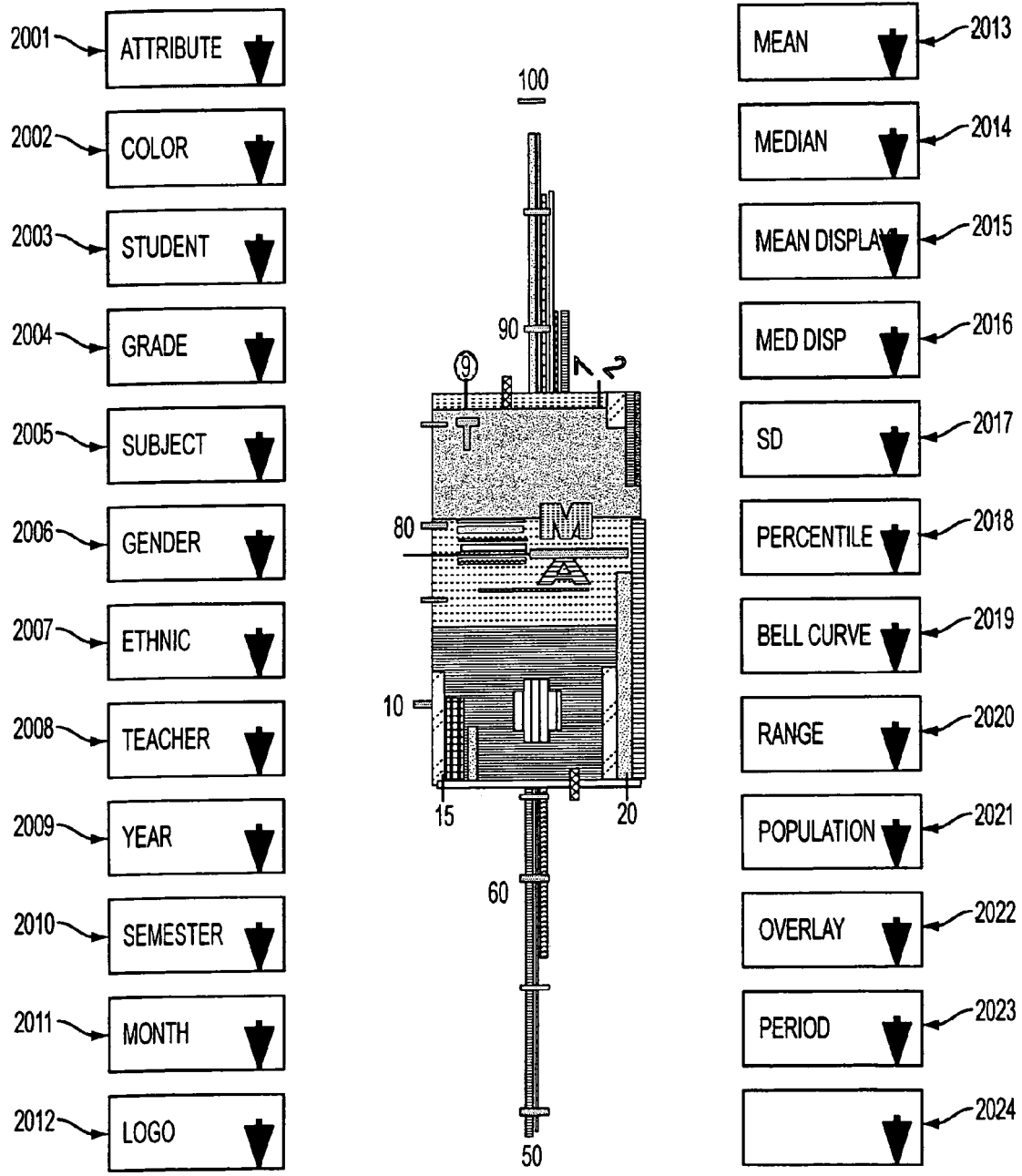
FIG. 20 illustrates an example of a user interface that can be used to view and manipulate enhanced box charts used for graphically displaying data for a class report card.

FIG. 20 illustrates an example of a user interface that can be used to view and manipulate enhanced box charts relating to student grades. According to an embodiment, access by an administrator, Principal, President, or other authorized individual may be unlimited. Access by others may be limited in combinations or permutations based on criteria set by the administrator, Principal, President, or other individual.

According to an embodiment of the invention, a desired enhanced box chart for study may be placed in an enhanced box chart reader by dragging, copying or opening it in a reader (described in detail above) or by otherwise causing a reader to be launched. Also, inside the reader, an enhanced box chart (or a series of enhanced box charts) may be generated or recalled (from saved files). The reader is capable of performing both tasks simultaneously and in combination.

According to an embodiment, each data field (2001–2023) shown in FIG. 20 may enable a user to either input (type) words or numbers, choose words from a pull-down list, or import them from another application.

In Attribute box 2001, a user may choose a form by which he wants a particular parameter to be displayed. For example, a user may choose lines, the order in which they are displayed, the length and thickness of a segment of the "lead" line (other similar parameters will be segmented or sized relative to that), and position placement (horizontal or vertical), etc.

A user may also choose boxes, the order in which they are displayed, the size and shape of the lead (master) box (other similar parameters will be segmented or sized relative to that), and position placement, etc. According to an embodiment, a "NEW" option may be provided in the Attribute pull-down list. By choosing that option, a user can input new or additional Attributes not provided. For example, a user may desire to show a certain parameter by a octagon, or a shape not provided. A user may also desire to introduce a zigzag line, curly line, or line not provided.

In Color box 2002, a user may "pull-down" a list that enables him to choose a color palette or an advanced color "wheel." An AUTO option may also enable a user to choose from several pre-defined color arrangements and/or a "mix-and-match" feature where colors may be automatically chosen.

In Student box 2003, the name of the student (e.g., Jane Doe) may be inputted or selected from a pull-down list. Her grade point average may be displayed as a horizontal line segment in Black. The Lower Width can be automatically (or manually) self-scaled to show her age. By clicking on the right end of the Black line, the student's name and/or picture can be displayed. By then clicking on her name (now displayed), or by clicking on the left side of the Black line, the student's biographical information can be displayed where her file is opened for viewing by the Principal (or any other authorized personnel).

In Grade box 2004, the grade (class) may be inputted or selected from the pull-down list. The AUTO feature may be displayed on top of the pull-down list. Choosing this option may cause the enhanced box chart to automatically choose the grade of the student, Jane Doe, for comparative study or evaluation. The Upper Width can be automatically (or manually) self-scaled to show her grade.

In Subject box 2005, the course subject may be inputted or otherwise selected from the pull-down list. An AUTO T option allows the subject to be automatically matched to the teacher below. An AUTO G option allows the subject to be automatically matched with her grade point, above.

In Gender box 2006 the gender is inputted or otherwise selected from the pull-down list. A "lead" Gender box is selected by highlighting it in Attribute box 2001 and choosing the color from Color box 2002. An AUTO option in the list automatically matches the gender with the student name, Jane Doe, above. It should be noted that gender can be user-defined and can be represented by, for a horizontal or vertical bar.

According to an embodiment of the invention, Ethnic box 2007 may be similar to Gender box 2006. As illustrated in FIG. 20, ethnics (or ethnicities) may be represented by three proportional boxes that form the body portion.

In Teacher box 2008, the name of the teacher under whom the student's performance is being measured may either be inputted or selected from the pull-down list. An AUTO S option allows the teacher to be automatically matched to the subject. An AUTO G option allows the teacher to be automatically matched with the student's grade. The teacher is automatically (or manually) assigned to the Teacher Logo. Her name, picture or both can be designed to pop out as the mouse is run over the Teacher Logo.

In Year box 2009, the year in which the student's performance is being measured may be inputted or selected from the pull-down list. An AUTO option chooses the current year as default.

According to an embodiment, Semester box 2010 may be similar to Year box 2009. An EXAM option allows a user to choose the particular exam given in that Semester.

According to an embodiment, Month box 2011 may be similar to Year box 2009 or Semester box 2010. An EXAM option lets a user choose the particular exam given in that Month.

According to an embodiment, Logo box 2012 has multiple purposes. First, it shows the sub-organizations. In the example of FIG. 20 in the main text, a user may input or choose from a pull-down list the various state chapters that made up this overall enhanced box chart of a Red Cross Preparedness course (e.g., California Red Cross, New York Red Cross, etc.). From there, a user may go to the enhanced box charts of these states to cities, towns, etc. For a school, various campuses may be provided in the drop-down list.

Second, in comparative studies the Logo may help to quickly identify an organization (e.g., helping distinguish Harvard from Yale from Princeton, etc.).

Third, by positioning a mouse or other pointer instrument over the Logo of a parameter, additional information may be obtained. For example, by moving the mouse over the Logo T, the name and/or picture of the teacher can be displayed. By clicking on the name and/or picture of the teacher, the teacher's biography may be displayed. In one embodiment, the Principal or President can then go to the teacher's evaluation enhanced box chart in her personnel file and from there, retrieve various additional information.

Further, in this application, a user may either input or choose from a drop-down list from the different Logos on the enhanced box chart. In one embodiment, the interface can also include Partial (Sub-Logo) boxes (not shown). Here, a user may input or choose from a drop-down list, the sub-organization under that particular Sub-Logo. In one example, the "Red Cross" and "T" of FIG. 20 could represent two possible Sub-Logos. In one embodiment, the interface could also include an Advance box where a user can enter or define new or additional Logos or change existing Logos.

In Mean box 2013, a user may input or select the period during which its mean is used in evaluation. The default value may comprise the current grade. In one embodiment, the pull-down list may reveal several choices including, but not limited to, Overall, Gender, Ethnic and Advance.

In Overall, Gender and Ethnic, a user may choose the mean either by inputting the desired period (e.g., Jan. 2, 1999–Nov. 6, 1999), or by choosing it from pre-defined means. If a user desires more specific manipulation for his measurement, such as evaluating a student (e.g., Jane Doe) within multiple ranges, he may choose the Advance option. Here, the user may be provided with an expanded choice where he can input and/or choose (from various pull-down lists) additional criteria in calculating the mean. This additional criteria may, for instance, comprise family income level, neighborhood, bus route, etc. Here, the neighborhood additional criteria would enable the neighborhood to be inputted, or chosen from a pull-down list. An AUTO option may be provided on top of the pull-down list such that the Neighborhood is automatically chosen from the student's address in the database.

This example illustrates how evaluations of students' performance can be performed for different public high-rises within a single school district. This expeditious visualization enables parents, officials, policy makers, etc. to form an informed, objective opinion quickly. This is in contrast to viewing tables, various dissociated graphs, or long phrases or paragraphs that attempt to convey the same information.

According to an embodiment of the invention, Median box 2014 may be similar to Mean box 2013.

In Mean Disp box 2015, mean dispersion measures how close samples (i.e., students' performance) are to the mean. A user can set the value manually, or he can choose a desired, pre-defined value from the pull-down list. In Attributes box 2001, a user may choose the form (the width side here). A user may also choose the unit that is then denoted by the thickness of the line (e.g., Lower Width).

According to an embodiment of the invention, Median Disp box 2016 is similar to Mean Disp box 2015.

In SD box 2017, standard deviation (or a multiple thereof) can be used as a parameter to be displayed, and also to denote the upper and lower ends of the body portion. SD is also used in comparative study of multiple enhanced box charts over a time period.

In Percentile box 2018, a user may input, or choose from a pull-down list, the percentile he or she desires to set to denote the upper and lower sides of the enhanced box chart. In Attribute box 2001, a user may choose the form (of the box), its size and how it is to be self-scaled.

According to an embodiment, a user may choose Bell Curve box 2019 if he or she desires to have the area of the body portion denote the area under the bell curve (between any two numbers under the curve). A user may input the higher and lower numbers, or choose from the drop-down list to denote the upper and lower sides of the body portion. The width may be calculated automatically. In Attribute box 2001, a user may select the form of the body portion and the form of self-scaling of the body portion. In Color box 2002, a user may select the colors of these elements.

It should be noted that as in previous parameters, if a user decides to choose, e.g., percentile as the upper and lower sides of the body portion, this area can be shown by another form chosen from Attribute box 2001, e.g., a partial length whose thickness denotes if the bell curve is narrow or wide (grade points are mostly concentrated around the mean or are more spread out).

In Range box 2020, the upper and lower numbers may be inputted or chosen from a drop-down list. In the drop-down list, an option box called Partial (Sub-Range) may be provided. This box sets the data samples (grade points) between the maximum and minimum ranges, and the top and bottom of the body portion. In Attribute box 2001, a thickness may be chosen as the lead thickness, and other thicknesses (signifying the number of each sample at that grade point) are automatically calculated based on this designation.

According to an embodiment, an Advance box may also be provided in the drop-down list. In this box, these (partial) ranges may further be refined to signify additional parameters such as gender, ethnicity, income level, neighborhood, etc., by various colors chosen from Color box 2002.

In Population box 2021, the total population may be inputted or chosen from the drop-down list. In the drop-down list, an option box called Partial (Sub-Population) may be provided. The drop-down list may further comprise parameters whose population a user desires to manipulate in his evaluation, such as gender, ethnicity, income level, neighborhood, bus-route, family composition, etc. These values can be inputted individually, or chosen from additional drop-down lists.

In the Population, Sub-Pop, Gender, Ethnic, etc. boxes, there can be an AUTO option in each box. By choosing this option, every value below this tree may be automatically calculated.

According to an embodiment, overlay box 2022 may comprise a drop-down list that enables a user to overlay a complete or partial enhanced box chart over another enhanced box chart, either transparently or translucently. First, a user may select the Transparent or Translucent option. From each of these options, a user may be led to a drop-down list that sets forth a number of pre-defined configurations (e.g., overlaying gender composition over ethnic, overlaying neighborhood composition over income level, etc). There is also an Advance option that enables a user to customize the Overlay. This option may further enable a user to overlay more than two (partial) enhanced box charts over another enhanced box chart. The Advance feature may also include an option that enables two or more dissimilar enhanced box charts to be overlaid for comparative purposes by "normalizing" them.

Normalization may include converting them temporarily or permanently to a set of "common" features. For example, consider two enhanced box charts, one to be laid over another. K1 has weighted average as its upper and lower sides of the body portion, while K2 has percentile. K1 may be converted to percentile; or both may be converted to a Bell Curve. Enhanced box chart scales can also be normalized (made uniform) for comparative purposes. For example, if K1 shows 10 points by 1 cm. while another (K2) shows 15 points by 2 cm., both may be normalized to a single scale. These normalizations may be performed manually or automatically.

According to an embodiment, Period box 2023 enables a user to set his/her timeframe in calculating other parameters. The pull-down list enables a user to set various parameters to different timeframes. For example, the performance of a student, Jane Doe, can be compared to her performance two years ago (Student evaluation); the performance of the Physical Education class this year can be compared to that of 1998 and 1999 (Teacher evaluation); etc.

In Blank box 2024, blank data fields (boxes) are provided, as needed, to enable a user to formulate anything not satisfying his needs in manipulation, calculation, Attribute, etc. When a blank box is customized by a user, a new blank box may be displayed. According to one implementation, a user may input the number of blank boxes he or she believes are necessary such that they may all be provided at the same time. The user may later close un-used boxes. This feature may proves useful where, for example, a user desires to show the covariance between two parameters, or effect a calculation not provided. As an additional example, the feature may be useful where, for instance, a user wishes to define a new parameter called Leadership to enable a Student's Leadership ranking to be measured against his/her Class, School, etc.

According to an embodiment of the invention, each of the boxes (2001-2023) illustrated in FIG. 20 may include a common Close option in their drop-down lists. If a user wishes to maximize space in a particular view (display), he or she may close one or more boxes that may be unused during a session by selecting the Close option in the appropriate box. After a particular box has been closed, a down arrow may appear in Blank box 2024. Selecting (e.g., "clicking-on") this down arrow may provide a drop-down list of all closed Boxes. Selecting any closed box in the drop-down list may result in that particular box being re-opened in the display. An ALL option may be provided at the end of the drop-down to enable a user to open all of the closed boxes at the same time.

As described above, data can be imported. Thus, according to one embodiment, boxes 2001-2023 may, in their drop-down or sub-drop-down lists, include an import option for importing data from other applications.

For illustrative purposes, one example of a drop-down list and its progression is now provided with reference to FIG. 20 and grade-related data. If a grade is not entered manually, selecting (e.g., "clicking") the arrow in Grade box 2004 may list various options including, for instance, Pre-School (PS), Lower School (LS), Middle School (MS), High School (HS), Import and Close. Clicking on the arrow in the MS box, for example, may result in a list of options including 6, 7, 8, and Import. Selecting the arrow in the 7 box may then result in a list of options including 7-1, 7-2, and 7-3, which may respectively represent the three sections (classes) of the 7th Grade. Other variations are of course possible.

COMPANY A PERFORMANCE EXAMPLE

Figure 21:
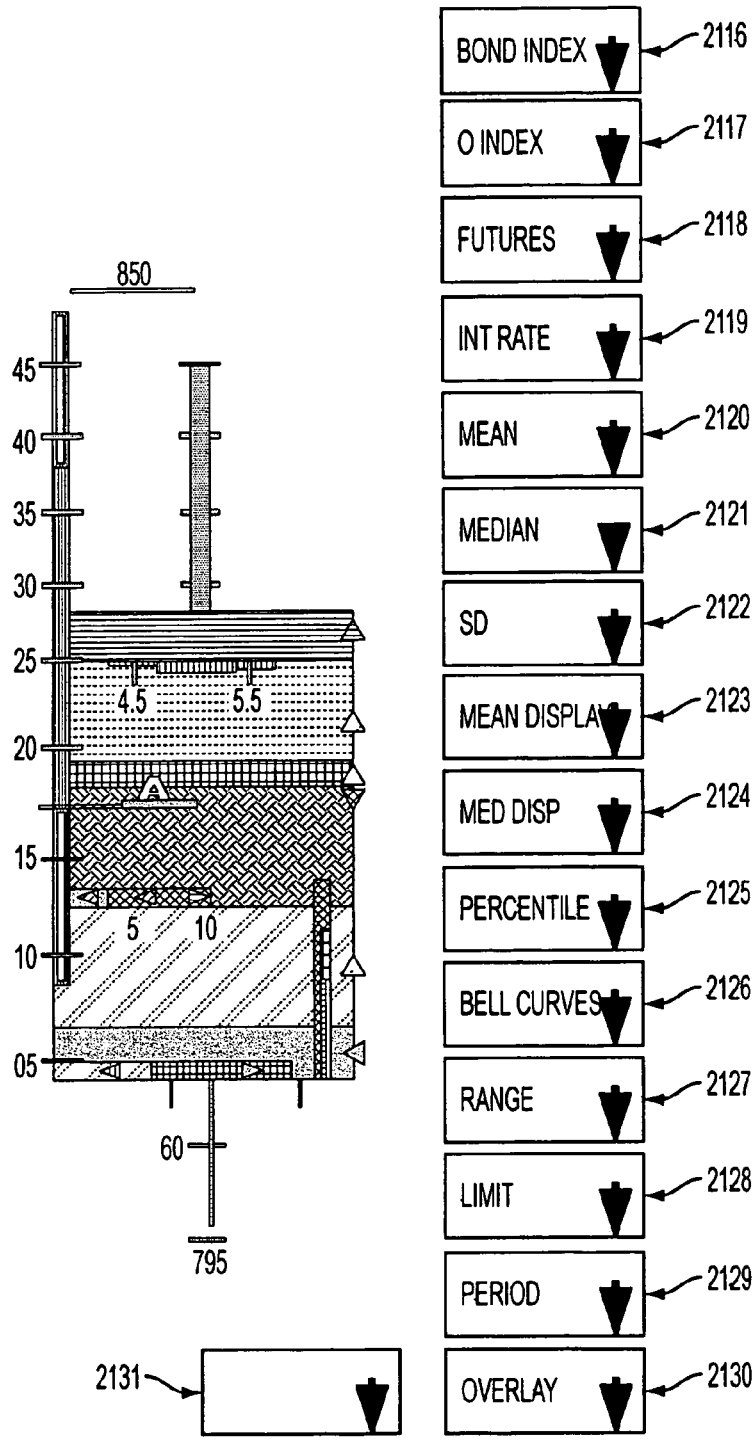
FIG. 21 illustrates an example of a user interface that can be used to view and manipulate enhanced box charts relating to portfolio performance.

FIG. 21 illustrates a second example of a user interface that can be used to view and manipulate enhanced box charts relating to portfolio performance. In this example, the Chief Financial Officer (CFO) of Company A may use the enhanced box chart illustrated in FIG. 21 to present the portfolio performance of Company A (in addition to other metrics either internally or externally related to Company A) to the board of directors.

The quarterly performance enhanced box chart may comprise the main presentation. Various parts of the portfolio (stocks, bonds, etc.) may be presented inside the body portion, which represents the opening and closing price of the Portfolio (in $B). The average (mean) value of the portfolio (Pc+Po)/2 is shown by "A".

In this example, the range of the portfolio in the quarter is presented as the "up" and "down" extensions. The relative thickness of the two extensions indicates the amount of time the portfolio was in that space (e.g., between close and high, and between open and low). The Black color of the extensions indicate that the portfolio ended in the black (i.e., its value increased).

The arrows on the right side of the body portion indicate whether each component part of the portfolio was up or down in the quarter. Further, the relative placement of the arrows indicates the amount the portfolio moved up, down or unchanged.

The previous year performance (i.e., high, low, open, close) is simultaneously shown on the left (portfolio value in $B). The relative (i.e., percentage) performance of the portfolio vs. S&P500, 30-Year T-Bond, 2-Year T-Note is shown at the lower right.

The employee headcount, their components (technical or non-technical) are shown in the lower horizontal side. Further, whether the headcount increased, decreased (both in terms of components and total) are shown as left and right arrows and the Black wraparound line (showing overall increase). Additionally, the amount of increase or decrease of each component is shown by the relative placement of the arrows. A scale on the lower horizontal side is displayed to represent the number of employees.

The output of each department (e.g., technical, trading/sales, administrative, etc.) is shown on the lower horizontal side of the Yellow box. Further, the increase or decrease in output of each department is illustrated by the direction of arrows. For example, the relative increase or decrease is shown by the relative placement of the arrows. The total output is shown as the Red wraparound line (showing overall decrease), and a scale on the lower horizontal side shows the amount of output. The interest rate movement during the quarter is shown below the upper horizontal side of the Violet box. The scale marks through it are for the interest rate.

As illustrated in the example of FIG. 21, the core portfolio consists of stocks (blue), bonds (light pink), cash (light green), mortgage backed securities, MBS (yellow), derivatives (dark pink), and other (non-specified) assets (dark green). Although non-portfolio assets (NPA) and mortgages owned in the core portfolio (i.e., the body portion) are not illustrated, they could be shown separately.

According to an embodiment, in each box, a user may either input words or numbers, choose them from a pull-down list, or import them from another application.

According to an embodiment, Attribute box 2101 and color box 2102 may be similar to their counterparts in FIG. 20.

In Portfolio box 2103, the name of the portfolio may be inputted, chosen from a pull-down list, or imported from another application. As an example, the pull-down list may include the following option structure:

| Portfolio -> | Overall -> | i) Parent; ii) Subsid. 1; iii) Subsid. 2; . . . |
|---|---|---|
| | Foreign -> | i) Parent; ii) Subsid. 1; iii) Subsid. 2; . . . |
| | Domestic -> | i) Parent; ii) Subsid. 1; iii) Subsid. 2; . . . |
| | AUTO | |

The AUTO option chooses the overall portfolio, and based on a body portion chosen from attribute and color scheme options or templates, calculate all of the components of the portfolio and its component parts (Stocks, Bonds, etc.). Each of the sub-portfolios may include an AUTO option where similar automatic calculation takes place.

In Price box 2104, the high, low, open, and close values of the portfolio may be set manually. An AUTO option allows for automatic price setting. The AUTO UPDATE option automatically calculates all values with the latest available data. According to some embodiments, the AUTO option in Portfolio box 2103 may have performed this calculation. An Advance feature allows for price setting for additional attributes both in a vertical and horizontal display setting.

Stock box 2105 allows for typing in the stock value. As an example, the pull-down list can include the following options:

```
Stock ->    Foreign
            Domestic ->
            Technology ->
            Retail
            Networking -> . . . -> CSCO
            Software
            . . .
```

At each point in the pull-down list, a value may be inputted or imported from another application. Changes (including additions or deletions) may cause the stock box in the body portion to be automatically re-sized, and cause all affected parameters to be re-calculated. An advance feature may enable users to display the performance of any (group of) stocks separately on the enhanced box chart. Further, the performance of any (group of) stocks can be displayed as a separate enhanced box chart for more detailed analysis.

In Cash box 2106, various Cash instruments like CDs, direct deposit, depositing institution, etc. may be accessed by inputting the information, selecting from a pull-down list, etc. as described above. Bond box 2107 and MBS box 2108 function similar to Stock box 2105 and Cash box 2106.

According to an embodiment, the functions of Derivatives box 2109 may be similar to Stock box 2105, Cash box 2106, Bond box 2107, and MBS box 2108. Additional options allow a user to display various parameters that constitute a Derivative on this enhanced box chart, or as separate enhanced box chart(s).

In NPA box 2110, non-portfolio assets may include tangible assets (e.g., real estate, computers, etc.) and non-tangible assets (e.g., IP, goodwill, etc.). NPAs could be shown as a box (a subset of the body portion), or illustrated in another manner. Mortgage Asset box 2111 functions are similar to NPA box 2110.

In O Asset box 2112, the other assets category can be included as a subset in the portfolio body portion. Empl box 2113 can be used to set employee data. Some data from this data field and its pull-down list can be presented on the lower horizontal side of the body portion.

Dept box 2114 can be used to set departments data. Some data from this data field and its pull-down list can be presented on the lower horizontal side of the MBS box (yellow).

In Stk Index box 2115, various stock indexes (e.g., S&P500, Dow Industrial, FTSE100, CAC40, etc.) are input or called up. The portfolio performance is measured against one such Index, S&P500.

In Bond Index box 2116, various bond indexes (e.g., 30-year T-Note, etc.) are input or called up. The portfolio performance is measured against two such Indexes, 30-Year T-Bond and 2-Year T-Note.

In O Index box 2117, other less common indexes such as Lehman Brothers' Bond Indexes may be chosen.

In Futures box 2118, futures' metrics are chosen.

In Interest Rate box 2119, various interest rates (e.g., Prime, 30-Year Mortgage, etc.) are accessed, displayed, or manipulated. An example of short-term rate movement during the quarter is given below the top horizontal line of the bond box.

In Mean box 2120, means (averages) of various parameters are input, chosen or calculated here. An example of the overall mean is displayed.

Median box 2121, SD box 2122, Mean Disp box 2123, Med Disp box 2124, Percentile box 2125, and Bell Curve box 2126 operate in a similar manner to their counterparts in FIG. 20.

In Range box 2127, the relative thickness of the upper and lower extensions indicate the number of days (weeks, months) the portfolio value was between high and close, and low and open. If the portfolio had lost value, the color of the extensions would have been red and thicknesses indicate time spent between high and open, and close and low.

For each section or sub-section of the portfolio, a unit is input in Unit box 2128. For stocks, as an example, the unit may signify the number of shares. For futures, the unit may signify the number of Contracts.

In Period box 2129, the enhanced box chart or any component or subset of it can be displayed between any two dates.

Overlay box 2130 enables the normalization of various metrics or enhanced box charts versus other enhanced box charts or parameters, such as displaying re-calculations of enhanced box charts based on parameters such as interest rate change.

According to an embodiment, Blank box 2131 operates in a similar manner to its counterpart in FIG. 20.

As can be seen, the Portfolio enhanced box chart may involve little statistical work. This enhanced box chart is primarily data display. This shows the enhanced box chart's flexibility from purely data presentation to purely statistical presentation and anything in between. In this user interface, the chairperson, CEO, CFO (and those authorized) have unrestricted access to roam around any combination or permutation of data fields. Access by others is limited and can set by an Administrator or other individual.

EMPLOYEE PERFORMANCE EXAMPLE

In yet another example of an enhanced box chart's range of applications, consider the area of employee performance. Every aspect of an employee's performance, no matter how "unconventional," can be displayed by an enhanced box chart. Sophisticated human resources (HR) software such as PeopleSoft™ can export all of their data into enhanced box chart readers and/or integrate customized enhanced box chart readers into their software.

Figure 22:
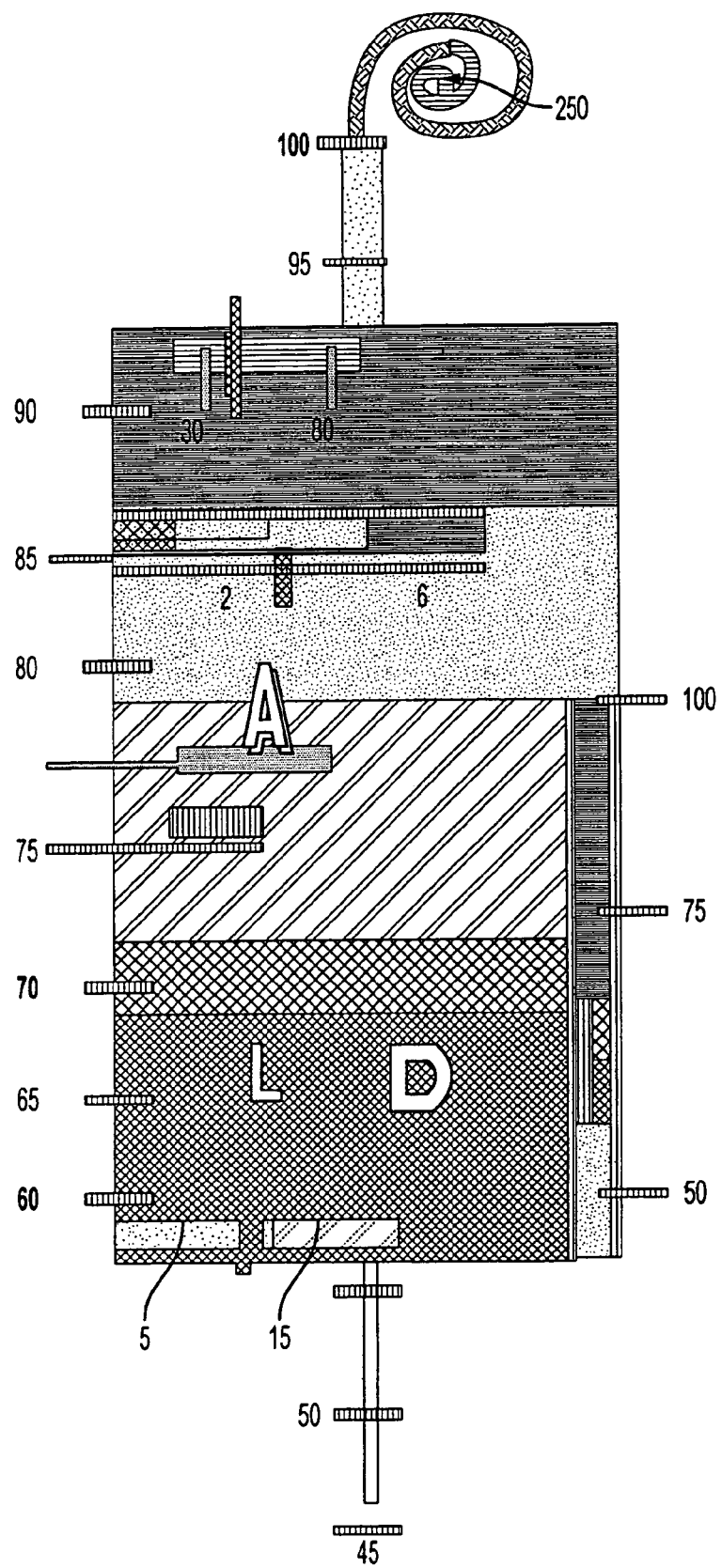
FIG. 22 illustrates an enhanced box chart showing a measure of employees' performance.

By way of example, FIG. 22 illustrates an enhanced box chart that displays a measure of employees' trips to the bathroom (monthly). As illustrated, all sorts of productivity metrics can be added to the enhanced box chart. The body portion has five subset age groups: 20–30 (orange), 30–40 (peach), 40–50 (light blue), 50–60 (green), and 60+ (dark blue).

The normal range is between 45–100. Three outliers (due to medical conditions) have trips up to 250/month. Two of these are in 30–40 (the first leg of the outlier) and One in 60+. Each of these lines is relatively thickened. The rest of the upper and lower extensions in green signify that these are within the normal range acceptable in medicine. The height of the body portion is set to 90 percentile of the employee population. The average (mean) trips of Employees is shown using the "A." The employee's (e.g., John Doe's) score is shown in his age group color. Instead of showing the means of each age group on the body portion, the HR department has decided to show it on a relative scale on the lower right side of the body portion, with outliers ignored. The scale on the right, again, shows the range of the trips (45–100), but in different scale from the left side. Each age group is shown in its assigned color.

Horizontally, a simple salary enhanced box chart of the company is shown on the upper part of the 60+ subset. The range is scaled, with the employee's salary shown in his age group color. Horizontally, on the upper part of the 50–60 subset, the medical cost of each age group is shown, with the employee cost shown in his age group color. Horizontally, at the bottom of the 20–30 subset the number of employees is shown, with male and female represented, relatively, by green and pink. The relative position on the male bar signifies that John Doe is a fairly recent hire.

The "L" location logo and "D" department logo signify the location and department involved. From any place that compares John Doe's place with other metrics, clicking on it would lead to his name/picture and from there his personnel file can be obtained. Further investigation can proceed from that point.

In this application, statistical and non-statistical data are both liberally displayed.

By the same token, employees' productivity (at every level desired), employing many metrics such as hours worked, days out sick, units produced per time frame, money spent at cafeteria, distance living from work, travel route, time starting, time quitting, time on phone, etc., can all, or in any combination/permutation, be viewed simultaneously to form a comprehensive picture.

Enhanced box chart readers can also be modified. In the enhanced box chart reader displaying student performance, for example, we can have an employee performance enhanced box chart by: a) re-defining some parameters (e.g., redefining grade point as salary, where inputting the employee' name instead of the student's name will activate this field); b) leaving some fields the same like gender; and c) defining some Blank boxes with new parameters like Trip (signifying the number of trips to the bathroom).

Figure 23:
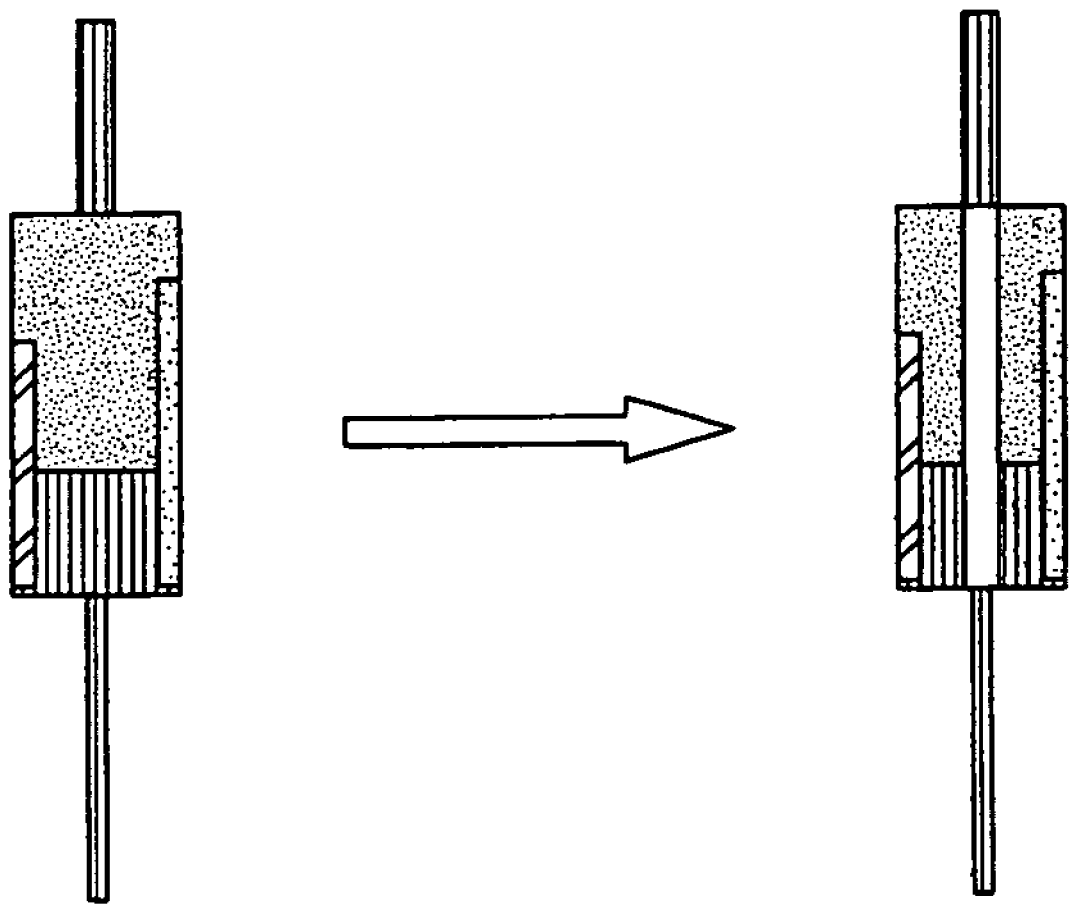
FIG. 23 illustrates an enhanced box chart having multiple body portions.

Multiple Body Portions. According to another aspect of the invention, an enhanced box chart may have more than one body portion. By way of example, and with reference to FIG. 23, an enhanced box chart is shown for representing intra-day stock price. The width of an Enhanced Box Chart (substituting for a candlestick) represents a unit of time. The example of FIG. 23 shows a daily Enhanced Box Chart with a rectangular discontinuity, thus creating two body portions. This discontinuity signifies the time period, including its beginning and ending, for example, when the trading of the stock was halted for "news pending." Such a halt may be mandated by a stock exchange when an important news or a major development about a stock is to be imminently announced. All such halts for any unit of time can be directly and conveniently displayed by the Enhanced Box Chart. In general, such discontinuity would be a user-defined indication that sample collection for that duration was interrupted. Many other uses of multiple body portions exist.

General Information. It is further within the scope of the invention to provide an objective graphical display of a measurement on a continuing or real-time basis. The invention can be applied to any time frame. The invention can also provide simple, visual graphical presentation of parameters or functions whose variable (or x-axis) is not time but user-defined. This provides a quick "feeling" of various data being displayed and their relationship, both in relative and absolute terms.

In general, the wealth and depth of information the invention displays in a simple-to-comprehend, visually graphic presentation is above other visually graphic presentations in use today for such purposes.

Further, the principles of the invention can be used for providing a quantifiable, objective yardstick and frame of reference for measuring many parameters simultaneously and for providing graphically visual comparisons of them that have conventionally been done on a qualitative basis only, or on a rudimentary quantitative basis because of the absence of such quantifiable, objective measuring display technique and system.

Further, the principles of the invention enable the display of data that can be viewed against multiple frames of reference simultaneously and immediately and objectively for comparative or other purposes.

Various advantages of the invention can be realized and include the establishment of, among other things, a universal method of measuring and comparing that is objective, quantifiable, simple, graphically visual, applicable in all time frames, applicable across all disciplines, applicable to non-temporal variables, scientifically rigorous, robust, and provides a wide array of (user-defined) data and criteria. Information viewed in the form of this simple graphic visualization are easily comprehensible by people with average education. Conclusions can be made quickly from this graphical observation that are objective and more comprehensible than other presently available graphically visual measuring tools. In addition to being a stand-alone, quantitative display method, the invention can be used as an adjunct to qualitative methods in use today. It can either confirm the qualitative observation and measurement; or, otherwise, its divergence may show some hitherto undiscovered "anomaly" in the qualitative measuring methodology or results which may prompt further investigation.

Additionally, and importantly, the invention can provide a quick "feel" for the data which can be the effect of all of the cumulative data and their relations and correlations as graphically displayed. In interactive media, such as computers or interactive TV's, the invention can enlarge or otherwise show details of any of its attributes such that, in a fractal manner, it can move down to show every single data sample. As the areas of human endeavors that display their data continue to specialize and sub-specialize in, by, through or as enhanced box charts grow and reach specialized and sub-specialized fields, additional attributes can be added or specified as required or needed by the specifics of those fields. Efficiency and productivity gains can be realized.

As thus described, the principles of the invention provide a graphical display and presentation of multiple data that is universal in nature and covers all fields of human knowledge or activity. As such, examples of use are too numerous to even attempt to list them. In addition to its general attributes, every specialty or subspecialty can "custom make" or customize the display to the needs of that particular field or particular workers in that field.

While the invention has been described in detail and with reference to specific embodiments thereof, it will be apparent to one skilled in the art that various changes and modifications can be made therein without departing from the spirit and scope thereof. Thus, it is intended that the invention covers the modifications and variations of this invention provided they come within the scope of the appended claims and their equivalents.

I claim:

1. A computer implemented graphical display for graphically displaying data from user selected data fields, the user selected data fields being selected from one or more user selectable data sets, the graphical display comprising:
   a user selected body portion, wherein the body portion has a substantially rectangular shape having a length and width, wherein the length represents a first data field from a user selectable data set and the width represents a second data field from a user selectable data set; and
   a user selected number of extensions that extend from the body portion, each extension representing at least one user selected data field from one or more user selectable data sets.

2. The graphical display of claim 1 where the body portion has a user defined shape.

3. The graphical display of claim 1 where the body portion has a user defined regular or irregular shape.

4. The graphical display of claim 1 where the body portion has a user defined dynamic shape.

5. The graphical display of claim 1 where the body portion has a user defined dynamic shape, where the shape changes based on changes in the value of one or both of the first data field and the second data field.

6. The graphical display of claim 1 where the body portion has a user defined dynamic shape, where the shape changes based on the occurrence of a predetermined event.

7. The graphical display of claim 1 where the body portion comprises a number of user defined attributes, where at least one of the user defined attributes include the shape of the body portion.

8. The graphical display of claim 1 where the body portion comprises a number of user defined attributes, where at least one of the user defined attributes include portions of the body portion, whereby the portions of the body portion represent one or more user selected data fields from one or more user selectable data sets.

9. The graphical display of claim 1 where the body portion comprises a three dimensional shape.

10. The graphical display of claim 1 where at least one extension has a substantially rectangular shape having a length and a width, where the length of the at least one extension's rectangular shape represents a third user selected data field from a user selectable data set and the width of the at least one extension's rectangular shape represents a fourth user selected data field from a user selectable data set.

11. The graphical display of claim 1 where at least one extension is a substantially linear shape having a length, where the length of the at least one extension's linear shape represents a user selected data field from a user selectable data set.

12. The graphical display of claim 1 where at least one extension has a user defined shape.

13. The graphical display of claim 1 where at least one extension has a user defined regular or irregular shape.

14. The graphical display of claim 1 where at least one extension has a user defined dynamic shape.

15. The graphical display of claim 1 where at least one extension has a user defined dynamic shape, where the shape changes based on changes in the value of user selected data.

16. The graphical display of claim 1 where at least one extension has a user defined dynamic shape, where the shape changes based on the occurrence of a predetermined event.

17. The graphical display of claim 1 where at least one extension comprises a number of user defined attributes, where each of the user defined attributes convey a value from different user selected data fields of a user selectable data set.

18. The graphical display of claim 1 where at least one extension comprises a number of user defined attributes, where at least one of the user defined attributes include the shape of the at least one extension.

19. The graphical display of claim 1 where at least one extension comprises a number of user defined attributes, where at least one of the user defined attributes include a dimension of the at least one extension.

20. The graphical display of claim 1 where at least one extension comprises a number of user defined attributes, where at least one of the user defined attributes include portions of the at least one extension, whereby the portions of the at least one extension represent one or more user selected data fields from one or more user selectable data sets.

21. The graphical display of claim 1 where at least one extension comprises at least a three dimensional shape, where at least some of the three dimensions represent different ones of one or more user selected data fields from one or more user selectable data sets.

22. The graphical display of claim 1 where at least one extension extends from a user selected portion of the body portion.

23. The graphical display of claim 1 further comprising at least one user selected sub-element located on, in or outside of the body portion, the at least one sub-element corresponding to user selected data.

24. The graphical display of claim 1 further comprising at least one user selected sub-element located on, in or outside of the body portion, the at least one sub-element corresponding to user selected data, where the at least one sub-element comprises an enhanced box chart.

25. The graphical display of claim 1 further comprising at least one user selected sub-element located on, in or outside of the body portion, the at least one sub-element corresponding to user selected data, the at least one sub-element having a user selected configuration.

26. The graphical display of claim 1 further comprising at least one user selected sub-element located on, in or outside of the body portion, the at least one sub-element corresponding to user selected data, the at least one sub-element having a user selected configuration selected from the group consisting of: an axis, a line, a shape, a symbol, a sign, an image, a video, a graphic, a link, a sound and a box chart.

27. The graphical display of claim 1 further comprising at least one user selected sub-element located on, in or outside of at least one extension, the at least one sub-element corresponding to user selected data.

28. The graphical display of claim 1 further comprising at least one user selected sub-element located on, in or outside of at least one extension, the at least one sub-element corresponding to user selected data, where the at least one sub-element comprises an enhanced box chart.

29. The graphical display of claim 1 further comprising at least one user selected sub-element located on, in or outside of at least one extension, the at least one sub-element corresponding to user selected data, the at least one sub-element having a user selected configuration.

30. The graphical display of claim 1 further comprising at least one user selected sub-element located on, in or outside of at least one extension, the at least one sub-element corresponding to user selected data, the at least one sub-element having a user selected configuration selected from the group consisting of: an axis, a line, a shape, a symbol, a sign, an image, a video, a graphic, a link, a sound and a box chart.

31. The graphical display of claim 1 further comprising at least one user selected sub-element located on, in or outside of at least one extension, the at least one sub-element corresponding to user selected data, the at least one sub-element having a user selected configuration selected from the group consisting of: an axis, a line, a shape, a symbol, a sign, an image, a video, a graphic, a link, a sound and a box chart, wherein the at least one sub-element is a dynamic sub-element.

32. The graphical display of claim 1 wherein data included in the one or more user selectable data sets comprises qualitative and/or quantitative data.

33. The graphical display of claim 1 wherein the first data field includes a minima, a maxima and at least one user defined intermediate range lying between the minima and maxima, wherein the length of the body portion represents the intermediate range, and wherein the extensions comprise at least a first extension that extends from one end of the body portion and has a dimension corresponding to the distance between the minima and a lower end of the intermediate range, and at least a second extension that extends from another end of the body portion and has a dimension corresponding to the distance between an upper end of the intermediate range and the maxima.

34. The graphical display of claim 1 wherein the body portion is defined by one or more lines, each having a thickness, where the thickness of the one or more lines represents a user selected data value or information.

35. The graphical display of claim 1 wherein the body portion is defined by one or more lines, each having a color, where the color of the one or more lines represents a user selected data value or information.

36. The graphical display of claim 1 where the body portion comprises a number of user defined attributes, where the attributes convey one or more of user selected data or information.

37. The graphical display of claim 1 where the body portion comprises a number of user defined attributes, where the attributes convey one or more of user selected data or information and where each extension comprises a number of user defined attributes, where the attributes include the shape of the extension.

38. The graphical display of claim 1 where the body portion comprises a number of user defined attributes, where the attributes convey one or more of user selected data or information, and where each extension comprises a number of user defined attributes, where the attributes include the shape of the extension and the dimensions of the extension.

39. The graphical display of claim 1 where the body portion comprises a plurality of separate body portions, wherein at least one of the separate body portions has a substantially rectangular shape having a length and a width, and wherein a first dimension of the at least one separate body portion includes the length of the rectangular shape and a second dimension of the at least one separate body portion includes the width of the rectangular shape, wherein each separate body portion comprises a number of user defined attributes that convey one or more of user selected data or information, and wherein the user defined attributes of at least one of the plurality of separate body portions comprises the shape of the at least one separate body portion and the dimensions of the at least one separate body portion, and wherein the number of body portions in the plurality of separate body portions represent user selected data or other information.

40. The graphical display of claim 1 where at least one extension has a substantially rectangular shape having a length and a width, where the length of the at least one extension's rectangular shape represents a third user selected data field from a user selectable data set and the width of the at least one extension's rectangular shape represents a fourth data user selected field from a user selectable data set, and where the at least one extension meets the body portion at a location, wherein the location represents user selected data.

41. The graphical display of claim 1 where the body portion comprises a plurality of separate body portions, wherein at least one of the separate body portions has a substantially rectangular shape having a length and a width, wherein a first dimension of the at least one separate body portion includes the length of the rectangular shape and a second dimension of the at least one separate body portion includes the width of the rectangular shape, wherein each separate body portion comprises a number of user defined attributes that convey one or more of user selected data or information, where the attributes include the shape of at least one of the separate body portions, the dimensions of at least one of the separate body portions, and a number of body portions in the plurality of separate body portions, and where at least one extension has a substantially rectangular shape having a length and a width, where the length of the at least one extension's rectangular shape represents a third user selected data field from a user selectable data set and the width of the at least one extension's rectangular shape represents a fourth user selected data field from a user selectable data set.

42. The graphical display of claim 1 wherein the body portion comprises a plurality of body portions, wherein each of the body portions comprises a number of user defined attributes that convey user selected data or information, where the attributes include one or more of the shape of at least one of the body portions, the dimensions of at least one of the body portions, and the number of body portions, and wherein at least one extension has a substantially rectangular shape having a length and a width, where the length of the at least one extension's rectangular shape represents a third user selected data field from a user selectable data set and the width of the at least one extension's rectangular shape represents a fourth user selected data field from a user selectable data set.

43. The graphical display of claim 1, further comprising at least one sub-element within the body portion, where the at least one sub-element includes one or more scales or axes.

44. The graphical display of claim 1, further comprising at least one sub-element within the body portion, where the at least one sub-element includes one or more self-scalable scales or axes.

45. The graphical display of claim 1, where each point in, on or outside the body portion displays user selected data.

46. The graphical display of claim 1, where a user selected combination of points in, on or outside the body portion displays user selected data.

47. The graphical display of claim 1, where a user selected combination of points in, on or outside the body portion comprise a user selected attribute.

48. The graphical display of claim 1, where a user selected combination of points in, on or outside the body portion comprise a user selected attribute, where the attribute includes at least a shape in, on or outside the body portion.

49. The graphical display of claim 1, where a user selected combination of points in, on or outside the body portion comprise a user selected attribute, where the attribute includes at least a dimension in, on or outside the body portion.

50. The graphical display of claim 1, where a user selected combination of points in, on or outside the body portion comprise a user selected attribute, where the attribute includes at least a thickness in, on or outside the body portion.

51. The graphical display of claim 1, where a user selected combination of points in, on or outside the body portion comprise a user selected sub-element, where the sub-element includes a user selected configuration in, on or outside the body portion.

52. The graphical display of claim 1, where a user selected combination of points in, on or outside the body portion comprise a user selected sub-element, where the sub-element includes a user selected configuration selected from the group consisting of: an axis, a line, a shape, a symbol, a sign, an image, a graphic, a link, and a box chart in, on or outside the body portion.

53. The graphical display of claim 1, where each point in, on or outside each extension displays user selected data.

54. The graphical display of claim 1, where a user selected combination of points in, on or outside each extension display user selected data.

55. The graphical display of claim 1, where a user selected combination of points in, on or outside each extension comprise a user selected attribute.

56. The graphical display of claim 1, where a user selected combination of points in, on or outside each extension comprise a user selected attribute, where the attribute includes at least a shape in, on or outside the body portion.

57. The graphical display of claim 1, where a user selected combination of points in, on or outside each extension comprise a user selected attribute, where the attribute includes at least a dimension in, on or outside the body portion.

58. The graphical display of claim 1, where a user selected combination of points in, on or outside each extension comprise a user selected attribute, where the attribute includes at least a thickness in, on or outside the body portion.

59. The graphical display of claim 1, where a user selected combination of points in, on or outside each extension comprise a user selected sub-element, where the sub-element includes a user selected configuration in, on or outside the body portion.

60. The graphical display of claim 1, where a user selected combination of points in, on or outside each extension comprise a user selected sub-element, where the sub-element includes a user selected configuration selected from the group consisting of: an axis, a line, a shape, a symbol, a sign, an image, a graphic, a link, and a box chart in, on or outside the body portion.

61. The graphical display of claim 1, where a color of at least one user selected point in, on or outside the body portion conveys user selected data.

62. The graphical display of claim 1, where a color of a user selected combination of points in, on or outside the body portion conveys user selected data.

63. The graphical display of claim 1, where a color of a user selected combination of points in, on or outside the body portion comprising a user selected attribute conveys a user selected data.

64. The graphical display of claim 1, where a color of a user selected combination of points in, on or outside the body portion conveys user selected data or information, wherein the body portion comprises a user selected attribute that conveys user selected data or information, and wherein the attribute includes at least a shape in, on or outside the body portion.

65. The graphical display of claim 1, where a color of a user selected combination of points in, on or outside the body portion conveys user selected data or information, wherein the body portion comprises a user selected attribute that conveys user selected data or information, and wherein the attribute includes at least a dimension in, on or outside the body portion.

66. The graphical display of claim 1, where a color of a user selected combination of points in, on or outside the body portion conveys user selected data or information, wherein the body portion comprises a user selected attribute that conveys user selected data or information, and wherein the attribute includes at least a thickness in, on or outside the body portion.

67. The graphical display of claim 1, where a color of a user selected combination of points in, on or outside the body portion conveys user selected data or information, wherein the body portion comprises a user selected sub-element, where the sub-element includes a user selected configuration in, on or outside the body portion.

68. The graphical display of claim 1, where a color of a user selected combination of points in, on or outside the body portion conveys user selected data or information, wherein the body portion comprises a user selected sub-element, where the sub-element includes a user selected configuration selected from the group consisting of: an axis, a line, a shape, a symbol, a sign, an image, a graphic, a link, and a box chart in, on or outside the body portion.

69. The graphical display of claim 1, where a color of each point in, on or outside each extension conveys user selected data.

70. The graphical display of claim 1, where a color of a user selected combination of points in, on or outside each extension conveys user selected data.

71. The graphical display of claim 1, where a color of a user selected combination of points in, on or outside each extension conveys user selected data or information, wherein each extension comprises a user selected attribute.

72. The graphical display of claim 1, where a color of a user selected combination of points in, on or outside each extension conveys user selected data or information, wherein each extension comprises a user selected attribute, and wherein the attribute includes at least a shape in, on or outside the body portion.

73. The graphical display of claim 1, where a color of a user selected combination of points in, on or outside each extension conveys user selected data or information, wherein each extension comprises a user selected attribute, and wherein the attribute includes at least a dimension in, on or outside the body portion.

74. The graphical display of claim 1, where a color of a user selected combination of points in, on or outside each extension conveys user selected data or information, wherein each extension comprises a user selected attribute, and wherein the attribute includes at least a thickness in, on or outside the body portion.

75. The graphical display of claim 1, where a color of a user selected combination of points in, on or outside each extension conveys user selected data or information, wherein each extension comprises a user selected sub-element, where the sub-element includes a user selected configuration in, on or outside the body portion.

76. The graphical display of claim 1, where a color of a user selected combination of points in, on or outside each extension conveys user selected data or information, wherein each extension comprises a user selected sub-element, where each sub-element includes a user selected configuration selected from the group consisting of: an axis, a line, a shape, a symbol, a sign, an image, a graphic, a link, and a box chart in, on or outside the extension.

77. The graphical display of claim 1, where each point in, on or outside the body portion dynamically displays user selected data.

78. The graphical display of claim 1, where each point in, on or outside each extension dynamically displays user selected data.

79. The graphical display of claim 1, where an attribute of a user selected combination of points in, on or outside the body portion dynamically changes to display user selected data.

80. The graphical display of claim 1, where an attribute of a user selected combination of points in, on or outside each extension dynamically changes to display user selected data.

81. The graphical display of claim 1, where a user selected color in, on or outside the body portion dynamically conveys user selected data.

82. The graphical display of claim 1, where a user selected color in, on or outside the body portion dynamically changes from one color into another to convey user selected data.

83. The graphical display of claim 1, where a user selected color in, on or outside each extension dynamically conveys user selected data.

84. The graphical display of claim 1, where a user selected color in, on or outside each extension dynamically changes from one color into another to convey user selected data.

85. The graphical display of claim 1, where a user selected color in, on or outside the body portion dynamically changes from one color into a plurality of colors to convey user selected data.

86. The graphical display of claim 1, where a user selected color in, on or outside each extension dynamically changes from one color into a plurality of colors to convey user selected data.

87. The graphical display of claim 1, where a user selected combination of points in, on or outside the body portion dynamically changes to a color to convey user selected data.

88. The graphical display of claim 1, where a user selected combination of points in, on or outside each extension dynamically changes to a color to convey user selected data.

89. The graphical display of claim 1, where the graphical display simultaneously displays more than one body portion and where at least two body portions have at least one point in common.

90. The graphical display of claim 1, where the graphical display simultaneously displays more than one body portion and where at least two body portions have no point in common.

91. The graphical display of claim 1, where rotating, turning, twisting, spiraling, curling, zigzagging, compressing, collapsing and/or tilting of the body portion, extensions, or any portions thereof may be utilized by the user to display certain data or information.

92. The graphical display of claim 1, where a full and/or partial area of any surface, boundary, side, intersection, plane or periphery of any two-or three-dimensional body portion and/or extension may be utilized by the user to display certain data and/or information.

93. The graphical display of claim 1, where a full and/or partial volume of any three-dimensional body portion and/or extension may be utilized by the user to display certain data and/or information.

94. The graphical display of claim 1, where a thickness of a full and/or partial line or length; a full and/or partial area; or a full and/or partial volume of any one-, two-, or three-dimensional body portion and/or extension may be utilized by the user to display certain data and/or information.

95. The graphical display of claim 1, where a color of points, full and/or partial lines, full and/or partial lengths, full and/or partial areas and full and/or partial volumes of any one-, two-, or three-dimensional body portion and/or extension may be utilized by the user to display certain data and/or information.

96. The graphical display of claim 1, where a self-scale, self-gradation, self-axis or color graded axis may be on and/or adjacent to at least one full and/or partial line, full and/or partial length, full and/or partial area, or full and/or partial volume.

97. The graphical display of claim 1, where data or pieces of information are presented as sound and various components of the sound including pitch, tone, level, frequency or harmonics may be utilized by the user to present certain data and/or information.

98. The graphical display of claim 1, where data or pieces of information are presented as light and various components of the light including intensity, reflection, refraction, phase angle, level, frequency or harmonics may be utilized by the user to present certain data and/or information.

99. The graphical display of claim 1, where scale, axis, self-scale and self-axis are presented as sound and various components of the sound including pitch, tone, level, frequency or harmonics may be utilized by the user to present certain data and/or information.

100. The graphical display of claim 1, where scale, axis, self-scale and self-axis are presented as light and various components of the light including intensity, reflection, refraction, phase angle, level, frequency or harmonics may be utilized by the user to present certain data and/or information.

101. The graphical display of claim 1, where the body portion and extensions can represent a normal distribution curve by having one of a full or partial body portion area relate to an area under a bell curve between two user-defined points.

102. The graphical display of claim 1, where the body portion and extensions can represent a normal distribution curve by having one of a full or partial body portion area relate to an area under a bell curve between two user-defined points and a lower full or partial extension area relate to an area between a smaller one of the user-defined points and a lower range of the bell curve.

103. The graphical display of claim 1, where the body portion and extensions can represent a normal distribution curve by having one of a full or partial body portion area relate to an area under a bell curve between two user-defined points and an upper full or partial extension area relate to an area between a larger one of the user-defined points and a higher range of the bell curve.

104. The graphical display of claim 1, where the body portion and extensions can correspond to the general form of a normal distribution curve.

105. The graphical display of claim 1, where the body portion and extensions can correspond to the general form of non-normal distribution curves and the area under the non-normal distribution curves.

106. The graphical display of claim 1, where the body portion and extensions can correspond to the general form of multi-polar curves and the area under the multi-polar curves.

107. The graphical display of claim 1, where the body portion and extensions can correspond to the general form of linear, non-linear, time-varying, multi-dimensional, or multi-variable curves and the area under such curves.

108. The graphical display of claim 1, where the body portion and extensions can correspond to user-defined statistically significant points and characteristics of linear, non-linear, time-varying, multi-dimensional, or multi-variable functions.

109. The graphical display of claim 1, where the body portion and extensions can correspond to user-defined statistically significant points and characteristics of digitized data and/or information.

110. The graphical display of claim 1, where the body portion and extensions can correspond to user-defined statistically significant points and characteristics of analog data and/or information.

111. The graphical display of claim 1, further comprising at least one outlier displayed continuously in the form of a collapsed line.

112. The graphical display of claim 1 wherein the graphical display comprises one or more of a computer printout; a display on a computer monitor, television, high definition TV, digital TV, or screen; a digital projection; a hologram; a virtual reality display; an augmented reality display; an augmented vision display; a three-dimensional display; or a tele-presence re-creation.

113. A computer implemented graphical display for graphically displaying user selected data, the graphical display comprising:
- a user selected body portion, wherein the body portion has a substantially rectangular shape having a length and a width, wherein the length represents a first data field from a user selectable data set and the width represents a second data field from a user selectable data set; and
- a user selected number of extensions that extend from the body portion, each extension representing at least one user selected data field from one or more user selectable data sets;
- wherein the body portion is interactive, such that in response to a user action with respect to a selected part of the body portion, the graphical display displays additional information about the data associated with the selected part of the body portion.

114. The graphical display of claim 113, where an occurrence of a user determined set of events enables another user selected data field from a user selectable data set to be conveyed by the graphical display.

115. A computer implemented method for graphically displaying user selected data fields from one or more data sets, the method comprising the steps of:
- enabling a user to graphically select user selected characteristics of a body portion of a box chart, the body portion having at least a first dimension representing a first user selected data field from a user selectable data set and a second dimension representing a second user selected data field from a user selectable data set;
- enabling the user to graphically assign the first user selected data field to the first dimension and enabling the user to graphically assign the second user selected data field to the second dimension;
- enabling the user to graphically select a user selected number of extensions to extend from the body portion of the box chart, each extension representing a user selected data field from a user selectable data set;
- enabling the user to graphically assign a user selected data field from a user selectable data set to each extension; and
- graphically displaying the box chart, including the body portion and the extensions.

116. A computer implemented system for graphically displaying user selected data fields from one or more data sets, the system comprising:
- at least one data source comprising multiple data sets;
- means for enabling a user to graphically select user selected characteristics of a body portion of a box chart, the body portion having two or more dimensions representing at least one user selected data field from user selectable data sets;
- means for enabling the user to graphically select a user selected number of extensions to extend from the body portion of the box chart, each extension representing at least one user selected data field from user selectable data sets;
- means for enabling the user to graphically assign at least one user selected data field from the user selectable data sets to each of the dimensions of the body portion;
- means for enabling the user to graphically assign at least one user selected data field from the user selectable data sets to each extension; and
- display means for graphically displaying the box chart, including the body portion and the extensions.

117. A computer implemented user interface for graphically displaying user selected data fields from one or more data sets, the user interface comprising:
- graphically displayed body portion selection control means for enabling a user to select user selected characteristics of a body portion of a box chart, the body portion having at least a first dimension representing a first user selected data field from a user selectable data set and a second dimension representing a second user selected data field from a user selectable data set;
- first graphically displayed control means for enabling the user to assign the first user selected data field to the first dimension and enabling the user to assign the second user selected data field to the second dimension;
- graphically displayed extension selection control means for enabling the user to select a user selected number of extensions to extend from the body portion of the box chart, each extension representing a user selected data field from a user selectable data set;
- second graphically displayed control means enabling the user to assign a user selected data field from a user selectable data set to each extension;
- display means for graphically displaying the box chart in the user interface, including the body portion and the extensions; and
- the first and second graphically displayed control means enabling the user to modify the box chart using the user interface.

118. A computer implemented graphical display for graphically displaying user selected student grade information, the graphical display comprising:
- a user selected body portion, wherein the body portion is a substantially rectangular shape having a length and a width, where the length represents a first user selectable set of grade related data and the width represents a second user selectable set of grade related data; and a user selected number of extensions that extend from the body portion, each extension representing user selectable set of grade related data.

119. The graphical display of claim 118 wherein the graphical display graphically displays grade report data, where the first user selectable set of grade related data includes a range of grades within a range of percentiles, and the graphical display displays an individual student's grade as a horizontal line through the body portion.

120. The graphical display of claim 119 wherein the graphical display further comprises at least one additional horizontal line through the body portion to represent one or more of a mean or median of a distribution of grades.

121. The graphical display of claim 119 wherein the graphical display further comprises one or more sub-elements that graphically represent a segmentation of a distribution of grades, the segmentation comprising one or more of race or gender information.

122. The graphical display of claim 118 wherein the graphical display graphically displays grade report data, where the first user selectable set of grade related data comprises a range of grades within a range of statistically significant points, and a dimension of at least one extensions represents grades outside of the range, and wherein the body portion comprises a plurality of portions that proportionally represent a demographic composition of students.

123. The graphical display of claim 118 wherein the graphical display graphically displays grade report data, where the first user selectable set of grade related data comprises a range of grades within a range of statistically significant points, a dimension of at least one of the extensions represents grades outside of the range, and the body portion and extensions are scaled and/or have at least one axis in, on or through them.

124. The graphical display of claim 118 wherein the graphical display graphically displays grade report data, where the first user selectable set of grade related data comprises a range of grades within a range of statistically significant points, the points having a user selected configuration selected from the group consisting of: percentiles, weighted averages, normal distribution cut-off points, and mean plus and minus multiples of statistical deviation; and where a dimension of at least one of the extensions represents grades outside of the range.

125. The graphical display of claim 118 wherein the graphical display graphically displays grade report data, where the first user selectable set of grade related data comprises a range of grades within a range of statistically significant points, and a dimension of at least one of the extensions represents grades outside of the range, and wherein the body portion comprises a plurality of separate portions that proportionally represent a demographic composition, the demographic composition having a user selected configuration selected from the group consisting of: gender, ethnicity, family characteristic, family income, family make-up, neighborhood, housing and means of transportation.

126. The graphical display of claim 118 wherein the graphical display graphically displays grade report data, where the first user selectable set of grade related data comprises a range of statistically significant points, and a dimension of at least one of the extensions represents grades outside of the range, and wherein the body portion comprises a plurality of separate portions that proportionally represent a demographic composition, the demographic composition having a user selected configuration.

127. The graphical display of claim 118 wherein the graphical display graphically displays grade report data, where the first user selectable set of grade related data comprises a range of grades within a range of statistically significant points, and a dimension of at least one of the extensions represents grades outside of the range, and wherein the body portion comprises a plurality of separate portions that proportionally represent a demographic composition, and an individual student's grade is displayed as a user-defined sub-element in, on or through the body portion or at least one of the extensions.

128. The graphical display of claim 118 wherein the graphical display graphically displays grade report data, where the first user selectable set of grade related data comprises a range of grades within a range of statistically significant points, and a dimension of at least one of the extensions represents grades outside of the range, and wherein the body portion comprises a plurality of separate portions that proportionally represent a demographic composition, and an individual student's grade is displayed as a user-defined sub-element in, on or through the body portion or at least one of the extensions, and at least one of the extensions represents one or more ranges of the demographic composition.

129. The graphical display of claim 118 wherein the graphical display graphically displays grade report data, where the first user selected set of grade related data comprises a range of statistically significant points, and a dimension of at least one of the extensions represents grades outside of the range, and wherein the body portion comprises a plurality of separate portions that proportionally represent a demographic composition, and an individual student's grade is displayed as a user-defined sub-element in, on or through the body portion or at least one of the extensions, and portions of the body portion and each extension are distinguished by an attribute.

130. The graphical display of claim 118 wherein the graphical display graphically displays grade report data, where the first user selectable set of grade related data comprises a range of statistically significant points, and a dimension of at least one of the extensions represents grades outside of the range, and wherein the body portion comprises a plurality of separate portions that proportionally represent a demographic composition, and an individual student's grade is displayed as a user-defined sub-element in, on or through the body portion or at least one of the extensions, and portions of the body portion and each extension are distinguished by an attribute and/or sub-element.

131. The graphical display of claim 118 wherein the graphical display graphically displays grade report data, where a range of user selected statistical data and information are represented by a range of user-defined attributes and/or sub-elements.

132. The graphical display of claim 118 wherein the graphical display graphically displays grade report data, where the first user selectable set of grade related data includes a range of grades within a range of percentiles, and the graphical display displays an individual student's grade as a horizontal line through at least one extension.

133. The graphical display of claim 118 wherein the graphical display graphically displays grade report data, where the first user selectable set of grade related data includes a range of grades within a range of percentiles, and wherein a dimension of at least one of the extensions represent grades outside of the range of percentiles.

134. A computer implemented user interface for graphically displaying user selected portfolio analysis data, the user interface comprising:

graphically displayed body portion selection control means for enabling a user to select a user selected body portion of a box chart, the body portion having at least a first dimension that represents a first user selectable set of portfolio related data and a second dimension that represents a second user selectable set of portfolio related data;

graphically displayed extension selection control means for enabling a user to select a number of extensions to extend from the body portion, each extension representing a user selectable set of portfolio related data; and display means for graphically displaying the box chart in the user interface, including the body portion and extensions.

135. The graphical display of claim 134 wherein the graphical display graphically displays for a user selected time frame, at least one of a minimum, a maximum, an open or a close value for the portfolio.

136. The graphical display of claim 134 wherein the graphical display graphically displays for a user selected time frame, at least one of a minimum, a maximum, an open or a close value for the portfolio and the body portion or at least one extension further comprises at least one attribute that represents a mean value of the portfolio.

137. The graphical display of claim 134 wherein the graphical display graphically displays for a user selected-time frame, at least one of a minimum, a maximum, an open or a close value for the portfolio, and wherein the body portion comprises a plurality of portions that represent components comprising the portfolio.

138. The graphical display of claim 134 wherein the graphical display graphically displays for a user selected time frame, at least one of a minimum, a maximum, an open or a close value for the portfolio, and wherein the body portion comprises a plurality of portions that represent components comprising the portfolio, and the body portion and extensions have scales and/or axes in, on, through or outside of them.

139. The graphical display of claim 134 wherein the graphical display graphically displays for a user selected time frame, at least one of a minimum, a maximum, an open or a close value for the portfolio, and wherein the body portion comprises a plurality of portions that represent components comprising the portfolio, the components having a user selected configuration selected from the group consisting of: stocks, bonds, cash, securities, certificates of deposits, mortgages, foreign currencies, credits, interests, dividends, obligations receivables, accounts receivables, notes, options, futures contracts, derivatives, tangible assets, intangible assets and good will.

140. The graphical display of claim 134 wherein the graphical display graphically displays for a user selected time frame, at least one of a minimum, a maximum, an open or a close value for the portfolio, and wherein the body portion comprises a plurality of portions that proportionally represent components comprising the portfolio, the components having a user selected configuration selected from the group consisting of: debts, accounts payable, interest payables, margin interests, obligations, pledges, and notes payable.

141. The graphical display of claim 134 wherein the graphical display graphically displays for a user selected time frame, at least one of a minimum, a maximum, an open or a close value for the portfolio, and wherein the body portion comprises a plurality of portions that proportionally represent components comprising the portfolio, and user selected sub-elements in, on, through or outside the portions of body portions and extensions represent a direction of change for the components comprising the portfolio.

142. The graphical display of claim 134 wherein the graphical display graphically displays for a user selected time frame, at least one of a minimum, a maximum, an open or a close value for the portfolio, and wherein the body portion comprises a plurality of portions that proportionally represent components comprising the portfolio, and user selected attributes and/or sub-elements in, on or outside the body portion and extensions represent user-defined portfolio related data.

143. The graphical display of claim 134 wherein the graphical display graphically displays for a user selected time frame, at least one of a minimum, a maximum, an open or a close value for the portfolio, and wherein the body portion comprises a plurality of portions that proportionally represent components comprising the portfolio, and user selected attributes and/or sub-elements in, on or outside the body portion and extensions represent user-defined company related data.

144. A computer implemented user interface for graphically displaying user selected employee evaluation data, the user interface comprising:

graphically displayed body portion selection control means for enabling a user to select a body portion of a box chart, the body portion having at least a first dimension that represents a first user selectable set of employee evaluation related data and a second dimension that represents a second user selectable set of employee evaluation related data;

graphically displayed extension selection control means for enabling a user to select a user selected number of extensions to extend from the body portion, each extension representing a user selectable set of employee evaluation related data; and display means for graphically displaying the box chart in the user interface, including the body portion and extensions.

145. The graphical display of claim 144 wherein the graphical display graphically displays simultaneously two or more enhanced box charts, where each box chart represents evaluation related data for different periods of time, where the periods of time may be portions of the same year or different years.

146. The graphical display of claim 144 wherein the graphical display graphically displays user selected employee evaluation data, where the first set of employee evaluation related data comprises a range of employee evaluation related data within a range of statistically significant points, and a dimension of at least one of the extensions represents employee evaluation related data outside of the range of statistically significant points, and wherein the body portion comprises a plurality of portions that proportionally represent a demographic composition of the employees.

147. The graphical display of claim 144 wherein the graphical display graphically displays user selected employee evaluation data, where the first set of employee evaluation related data comprises a range of employee evaluation related data within a range of statistically significant points, and a dimension of at least one of the extensions represents employee evaluation related data outside of the range of statistically significant points, and wherein the body portion comprises a plurality of portions that proportionally represent a demographic composition, the demographic composition having a user selected configuration.

148. The graphical display of claim 144 wherein the graphical display graphically displays user selected employee evaluation data, where the first set of employee evaluation related data comprises a range of employee evaluation related data within a range of statistically significant points, and a dimension of at least one of the extensions represents employee evaluation related data outside of the range of statistically significant points; and wherein the body portion comprises a plurality of portions that proportionally represent a demographic composition, the demographic composition having a user selected configuration including one or more of: age, gender, ethnicity, seniority, education, experience, location, medical history, health, habits, salary, position or family make-up.

149. A computer implemented user interface for graphically displaying user selected securities or commodities price related data, the user interface comprising:

graphically displayed body portion selection control means for enabling a user to select a user selected body portion of a box chart, the body portion having at least a first dimension that represents a first user selectable set of securities price related data and a second dimension that represents a second user selectable set of securities price related data;

graphically displayed extension selection control means for enabling a user to select a user selected number of extensions to extend from the body portion, each extension representing a user selectable set of securities price related data; and display means for graphically displaying the box chart in the user interface, including the body portion and extensions.

150. The graphical display of claim 149 wherein the graphical display graphically displays for a user selected security for a user selected time frame, at least one of a minimum, a maximum, an open or a close value for the selected security.

151. The graphical display of claim 149 wherein the graphical display graphically displays for a user selected security for a user selected time frame, at least one of a minimum, a maximum, an open or a close value for the security and a dimension of at least one extension represents a volume of the selected security traded during the selected time frame.

152. The graphical display of claim 149 wherein the graphical display graphically displays for a user selected security for a user selected time frame, at least one of a minimum, a maximum, an open or a close value for the security and a dimension of at least a first extension represents a volume of the selected security traded at or near a high price during the selected time frame and a dimension of at least a second extension represents a volume of the selected security traded at or near a low price during the selected time frame.

153. The graphical display of claim 149 wherein the graphical display graphically displays within the body portion a first sub-element that represents an up volume and a second sub-element that represents a down volume.

154. The graphical display of claim 149 wherein the graphical display graphically displays simultaneously two or more enhanced box charts, where each box chart represents user selected securities price related data for a user selected period of time.

155. The graphical display of claim 149 wherein the graphical display graphically displays for a user selected security for a user selected time frame, at least one of a minimum, a maximum, an open or a close value for the selected security, and where the body portion comprises a plurality of portions that proportionally represent user selected significant characteristics of the selected security.

156. The graphical display of claim 149 wherein the graphical display graphically displays for a user selected security for a user selected time frame, at least one of a minimum, a maximum, an open or a close value for the selected security, and where the graphical display displays significant characteristics of the selected security as attributes and/or sub-elements in, on through or outside the body portion and/or at least one of the extensions.

157. The graphical display of claim 149 wherein the graphical display graphically displays for a user selected security for a user selected time frame, at least one of a minimum, a maximum, an open or a close value for the selected security, and one or more technical analysis metrics are represented as attributes and/or sub-elements in, on, through or outside the body portion and/or at least one of the extensions.

158. The graphical display of claim 149 wherein the graphical display graphically displays for a user selected security for a user selected time frame, at least one of a minimum, a maximum, an open or a close value for the selected security, and one or more technical analysis metrics are represented as attributes and/or sub-elements in, on, through or outside the body portion and/or at least one of the extensions; the metrics having a user selected configuration including one or more of: Moving Average, Moving Average Convergence Divergence ("MACD"), MACD Histogram, Relative Strength Index, Stochastics, Money Flow, On Balance Volume, Wilder's DMI, Volatility Index, Accumulation/Distribution Index, Price Oscillator ("PPO"), William % R, Aroon Index, Aroon Oscillator, Rate of Change, Bollinger Band Width, Bollinger Squeeze, Ultimate Oscillator, Price Relative, Volume, Oscillators, Indexes, Parabolic SAR, Standard Deviation, or Regression Curves.

159. The graphical display of claim 149 wherein the graphical display graphically displays for a user selected security for a user selected time frame, at least one of a minimum, a maximum, an open or a close value for the selected security, and multiple body portions represent interruption in sample collection in the selected time frame.

160. The graphical display of claim 149 wherein the graphical display graphically displays for a user selected security for a user selected time frame, at least one of a minimum, a maximum, an open or a close value for the selected security, and multiple body portions represent interruptions in sample collection in the selected time frame, where discontinuities represent a beginning, a duration and an ending of an interruption in sample collection, where such samples include price and volume data.

161. A computer implemented user interface for graphically displaying simultaneously two or more enhanced box charts representing user selected data, the user interface comprising:

graphically displayed body portion selection control means for enabling a user to select user selected characteristics of a first body portion for at least a first enhanced box chart, the first body portion having at least a first dimension that represents a first user selected data field from a user selectable data set and a second dimension that represents a second user selected data field from a user selectable data set;

first graphically displayed control means for enabling the user to assign the first user selected data field to the first dimension of the first body portion and enabling the user to assign the second user selected data field to the second dimension of the first body portion;

graphically displayed extension selection control means for enabling the user to select a number of extensions to extend from the first body portion, each extension from the first body portion representing a user selected data field from a user selectable data set;

second graphically displayed control means enabling the user to assign a user selected data field from a user selectable data set to each extension from the first body portion;

the graphically displayed body portion selection control means enabling the user to select user selected characteristics of a second body portion for at least a second enhanced box chart, the second body portion having at least a first dimension that represents a third user selected data field from a user selectable data set and a second dimension that represents a fourth user selected data field from a user selectable data set;

the first graphically displayed control means enabling the user to assign the third user selected data field to the first dimension of the second body portion and enabling the user to assign the fourth user selected data field to the second dimension of the second body portion;

the graphically displayed extension selection control means enabling the user to select a number of extensions to extend from the second body portion, each extension from the second body portion representing a user selected data field from a user selectable data set;

the second graphically displayed control means enabling the user to assign a user selected data field from a user selectable data set to each extension from the second body portion;

display means for simultaneously graphically displaying at least the first and second enhanced box charts in the user interface as a time series display, including the first body portion, the extensions from the first body portion, the second body portion, and the extensions from the second body portion; and the first and second graphically displayed control means enabling the user to modify the box chart using the user interface.

162. The graphical display of claim 161, where a plurality of user-desired averages are displayed through the time series display of the graphical display.

163. The graphical display of claim 161, where a plurality of user-desired central tendency metrics are displayed through the time series display of the graphical display, such metrics having a user selected configuration including one or more of: mean, median, moving average, moving median, weighted average or weighted median.

164. The graphical display of claim 161, where the time series display of the graphical display is substantially enveloped by a plurality of user-desired central tendency metrics plus and minus user-desired multiples of standard deviation.

165. The graphical display of claim 161 wherein the graphical display enables fractal representation to a desired level of any aspect of data displayed on the graphical display.

166. The graphical display of claim 165 wherein the user defines and/or limits a subsequent viewers' access to fractally view the enhanced box chart.

167. The graphical display of claim 165 wherein the user defines and/or limits a subsequent viewers' access to fractally manipulate the enhanced box chart.

168. The graphical display of claim 165 wherein various display elements are interactive so that when a user selects such an element, a fractal representation corresponding to the selected element is displayed.

169. The graphical display of claim 165 wherein various display elements are interactive so that when a user selects such an element, a fractal representation corresponding to the selected element is displayed as an overlay of the element.

170. The graphical display of claim 165 wherein various display elements are interactive so that when a user selects such an element, a fractal representation corresponding to the selected element is displayed an overlay of the element with transparency or translucency.

* * * * *